(12) United States Patent
Cho

(10) Patent No.: US 12,542,237 B2
(45) Date of Patent: Feb. 3, 2026

(54) MULTILAYER ELECTRONIC COMPONENT

(71) Applicant: SAMSUNG ELECTRO-MECHANICS CO., LTD., Suwon-si (KR)

(72) Inventor: Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 381 days.

(21) Appl. No.: 17/983,124

(22) Filed: Nov. 8, 2022

(65) Prior Publication Data

US 2023/0215633 A1    Jul. 6, 2023

(30) Foreign Application Priority Data

Dec. 31, 2021 (KR) .................. 10-2021-0194082

(51) Int. Cl.
 *H01G 4/12* (2006.01)
 *H01G 4/248* (2006.01)
 *H01G 4/30* (2006.01)

(52) U.S. Cl.
 CPC .............. *H01G 4/12* (2013.01); *H01G 4/248* (2013.01); *H01G 4/30* (2013.01)

(58) Field of Classification Search
 CPC ............. H10G 4/12; H01G 4/248; H01G 4/30
 USPC ................ 361/321.4, 311, 312, 321.1, 301.4
 See application file for complete search history.

(56) References Cited

U.S. PATENT DOCUMENTS

| | | | | |
|---|---|---|---|---|
| 2012/0250220 A1* | 10/2012 | Yamashita | ............. | H01G 4/005 361/321.2 |
| 2014/0085769 A1* | 3/2014 | Ueda | .............. | B82Y 30/00 361/301.4 |
| 2017/0025222 A1* | 1/2017 | Park | .............. | H01G 4/1209 |
| 2017/0032894 A1 | 2/2017 | Kawamura et al. | | |
| 2018/0182548 A1 | 6/2018 | Park et al. | | |
| 2021/0020380 A1 | 1/2021 | Sasabayashi et al. | | |

FOREIGN PATENT DOCUMENTS

| | | |
|---|---|---|
| KR | 10-2017-0013826 A | 2/2017 |
| KR | 10-2018-0073359 A | 7/2018 |
| KR | 10-2021-0010347 A | 1/2021 |

OTHER PUBLICATIONS

Office Action issued in corresponding Korean Patent Application No. 10-2021-0194082 dated Jun. 28, 2025, with English translation.

* cited by examiner

*Primary Examiner* — Arun Ramaswamy

(74) *Attorney, Agent, or Firm* — MORGAN, LEWIS & BOCKIUS LLP

(57) ABSTRACT

A multilayer electronic component includes a body including a dielectric layer and first and second internal electrodes disposed with the dielectric layer interposed therebetween in a first direction, first and second side margin portions respectively disposed on surfaces of the body in a third direction, and external electrodes respectively disposed on surfaces of the body in a second direction. The first side margin portion includes first dielectric grains, the dielectric layer includes second dielectric grains, and in cross-sections of the first side margin portion and the body in the first and third directions, a ratio of a major axis length to a minor axis length of the first dielectric grain is 3 or greater and 30 or less, and a ratio of a major axis length to a minor axis length of the second dielectric grain is 1.5 or less.

30 Claims, 15 Drawing Sheets

MULTILAYER ELECTRONIC COMPONENT

CROSS-REFERENCE TO RELATED APPLICATION

This application claims benefit of priority to Korean Patent Application No. 10-2021-0194082 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a ceramic electronic component, is a chip type condenser mounted on a printed circuit board (PCB) of various electronic products such as display devices including a liquid crystal display (LCD), a plasma display panel (PDP), and the like, computers, smartphones, cellular phones, and the like, to charge or discharge electricity.

Such an MLCC having advantages such as compactness, guaranteed high capacitance, and ease in the mounting thereof may be used as a component of various electronic devices. As various electronic devices such as computers, mobile devices, and the like, have become smaller and higher in power output, demand for miniaturization and higher capacitance of multilayer ceramic capacitors has increased.

In addition, as industry interest in electric parts for automobiles has recently increased, MLCCs are also required to have high reliability and high strength characteristics in order to be used in automobile or infotainment systems.

In order to miniaturize and increase capacitance of multilayer ceramic capacitors, it is necessary to maximize an effective area of electrodes (increase in an effective volume fraction required to realize capacitance).

In order to realize a small and high-capacitance multilayer ceramic capacitor as described above, a method of exposing internal electrodes in a width direction of a body in manufacturing a multilayer ceramic capacitor, thereby maximizing an area of the internal electrodes in the width direction through a design without a margin, and separately attaching a ceramic green sheet for a side margin portion to an electrode exposure surface of the body in the width direction before a process of sintering after the body is manufactured, and then performing sintering is applied.

As the side margin portion is formed by the method of separately attaching the ceramic green sheet for a side margin portion, capacitance per unit volume of the capacitor may be improved but stress may occur in a junction interface of the side margin portion and the body during sintering to cause delamination, cracks, etc, and lower reliability. Accordingly, there is demand for development of a multilayer electronic component capable of improving reliability by suppressing occurrence of delamination, cracks, and the like.

SUMMARY

An aspect of the present disclosure may provide a multilayer electronic component having excellent reliability.

An aspect of the present disclosure may also provide a multilayer electronic component in which an occurrence of delamination, cracks, etc. of a side margin portion is suppressed.

According to an aspect of the present disclosure, a multilayer electronic component may include: a body including a dielectric layer and first and second internal electrodes disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second side margin portions respectively disposed on the fifth and sixth surfaces; and external electrodes respectively disposed on the third and fourth surfaces. The side margin portion may include first dielectric grains, the dielectric layer may include second dielectric grains, and in cross-sections of the first side margin portion and the body in the first and third directions, a ratio of a major axis length to a minor axis length of the first dielectric grain may be 3 or greater and 30 or less, and a ratio of a major axis length to a minor axis length of the second dielectric grain may be 1.5 or less.

According to another aspect of the present disclosure, a multilayer electronic component may include: a body including a dielectric layer and first and second internal electrodes disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second side margin portions respectively disposed on the fifth and sixth surfaces; and external electrodes respectively disposed on the third and fourth surfaces. The first side margin portion may include first dielectric grains, and in cross-sections of the first side margin portion in the first and third directions, a ratio of a major axis length to a minor axis length of the first dielectric grain may be 3 or greater and 30 or less, and $Nm2/Nm1$ is 0.55 may be greater in which $Nm1$ is the number of first dielectric grains included in the first side margin portion and $Nm2$ is the number of first dielectric grains in which an angle between the first direction and the major axis is 45 degrees or less.

According to another aspect of the present disclosure, a multilayer electronic component may include: a body including a dielectric layer and first and second internal electrodes disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second side margin portions respectively disposed on the fifth and sixth surfaces; and external electrodes respectively disposed on the third and fourth surfaces. The first side margin portion may include first dielectric grains, and in cross-sections of the first side margin portion in the first and third directions, a ratio of a major axis length to a minor axis length of the first dielectric grain may be 3 or greater and 30 or less, and $Nm1/Nm0$ may be 0.09 or greater in which $Nm0$ is the number of dielectric grains included in the first side margin portion and $Nm1$ is the number of first dielectric grains.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
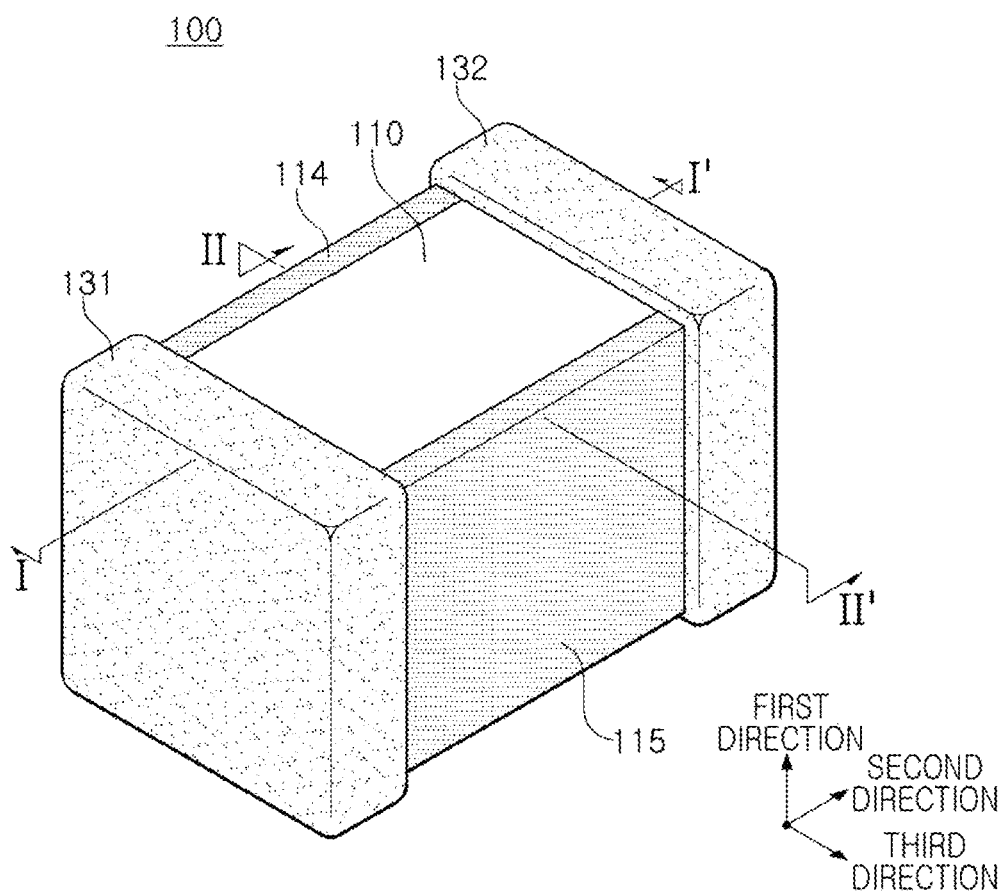
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a thickness (T) direction, a second direction may be defined as a length (L) direction, and a third direction may be defined as a width (W) direction.

Multilayer Electronic Component

Figure 2:
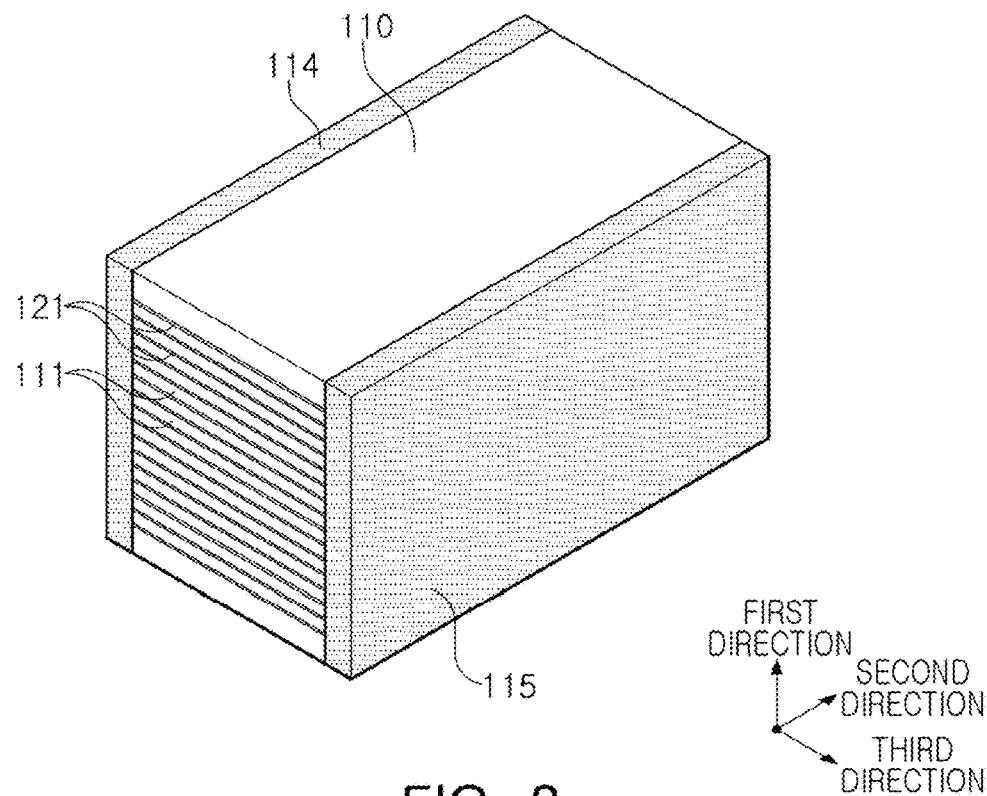
FIG. 2 is a perspective view illustrating the multilayer electronic component of FIG. 1 except for external electrodes.
Figure 3:
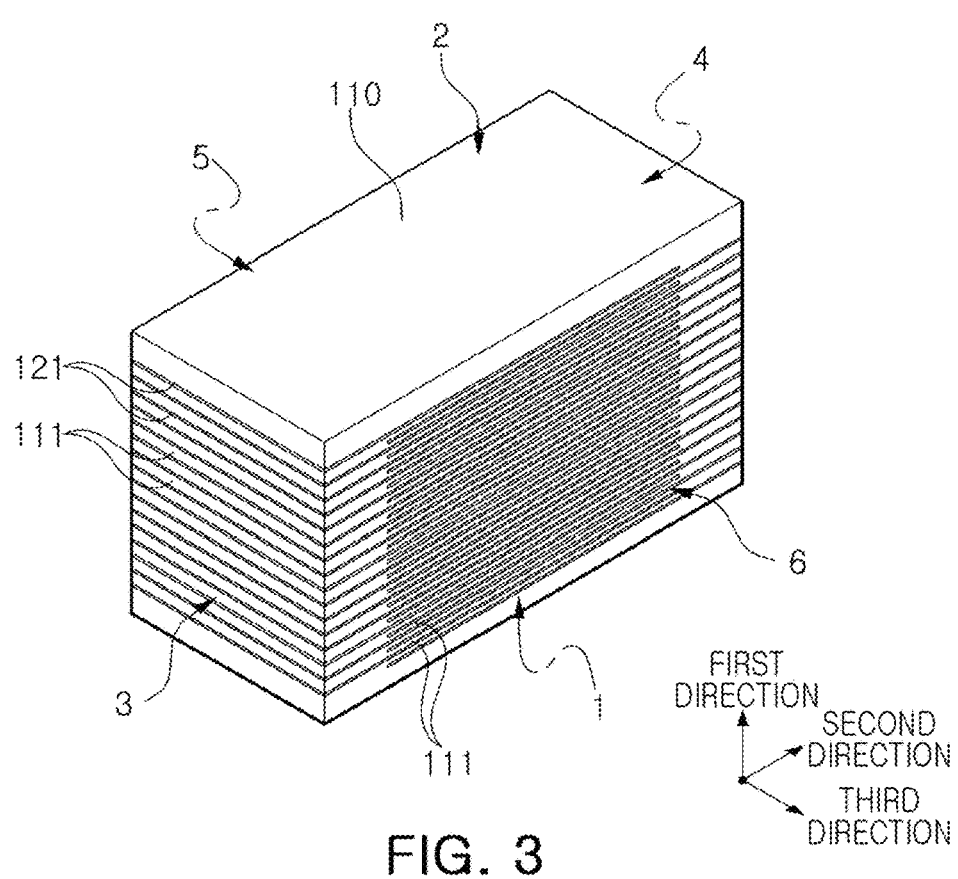
FIG. 3 is a perspective view illustrating the multilayer electronic component of FIG. 1 except for external electrodes and a side margin portion.
Figure 4:
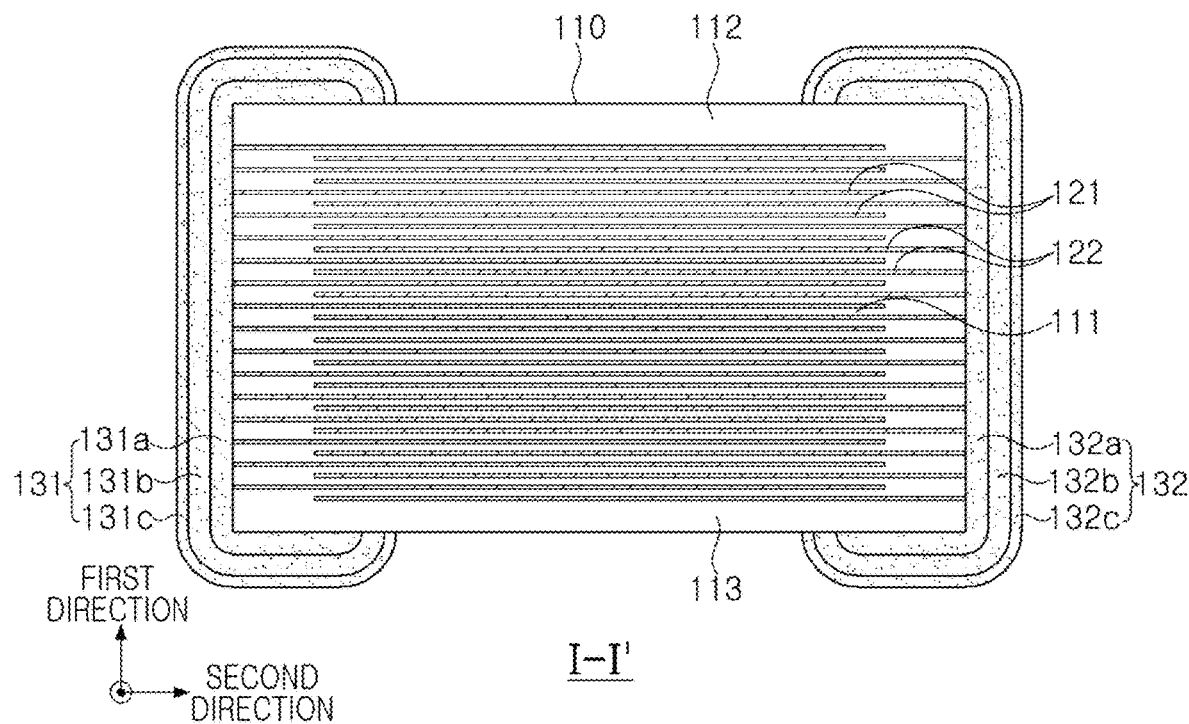
FIG. 4 is a cross-sectional view taken along line I-I' of FIG. 1.
Figure 5:
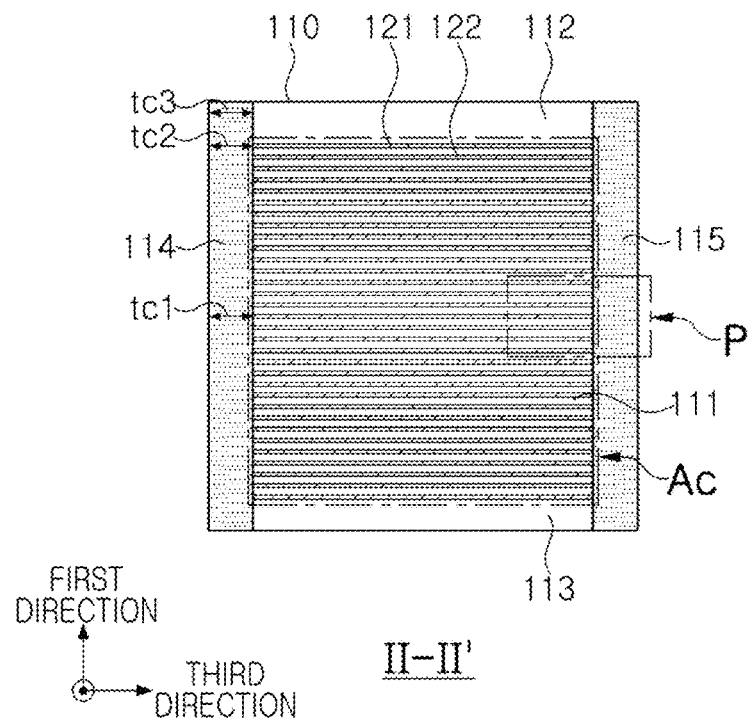
FIG. 5 is a cross-sectional view taken along line II-II' of FIG. 1.
Figure 6:
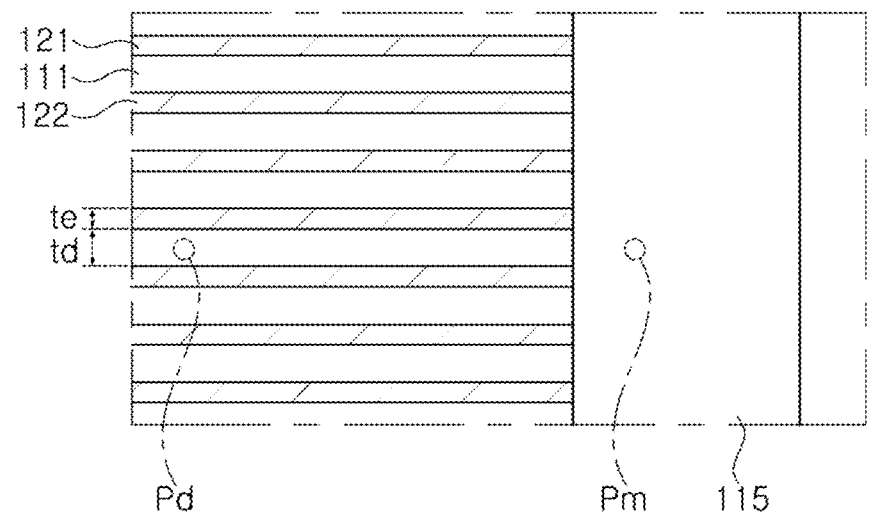
FIG. 6 is an enlarged view of region P of FIG. 5.

FIG. 1 is a perspective view schematically illustrating a multilayer electronic component according to an exemplary embodiment in the present disclosure. FIG. 2 is a perspective view illustrating the multilayer electronic component of FIG. 1 except for external electrodes. FIG. 3 is a perspective view illustrating the multilayer electronic component of FIG. 1 except for external electrodes and a side margin portion. FIG. 4 is a cross-sectional view taken along line I-I' of FIG. 1. FIG. 5 is a cross-sectional view taken along line II-II' of FIG. 1. FIG. 6 is an enlarged view of region P of FIG. 5.

Hereinafter, a multilayer electronic component 100 according to an exemplary embodiment in the present disclosure will be described with reference to FIGS. 1 to 6.

A multilayer electronic component 100 according to an exemplary embodiment in the present disclosure may include: a body 110 including a dielectric layer 111 and first and second internal electrodes 121 and 122 alternately disposed with the dielectric layer interposed therebetween in a first direction and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; side margin portions 114 and 115 disposed on the fifth and sixth surfaces 5 and 6; and external electrodes 131 and 132 disposed on the third and fourth surfaces 3 and 4. The side margin portions 114 and 115 may include a plurality of first dielectric grains G1, and in cross-sections of the side margin portions in the first and third directions, a ratio of a major axis length to a minor axis length of the first dielectric grain may be 3 or greater and 30 or less.

In the body 110, the dielectric layer 111 and the internal electrodes 121 and 122 are alternately laminated.

Although a specific shape of the body 110 is not particularly limited, as illustrated, the body 110 may have a hexahedral shape or a shape similar thereto. Due to shrinkage of ceramic powder included in the body 110 during a sintering process, the body 110 may not have a perfectly straight hexahedral shape but may have a substantially hexahedral shape.

The body 110 may include first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first and second surfaces 1 and 2 and connected to the third and fourth surfaces 3 and 4 and opposing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient capacitance may be obtained. For example, a barium titanate-based material, a lead composite perovskite-based material, or a strontium titanate-based material may be used. The barium titanate-based material may include a $BaTiO_3$-based ceramic powder, and the ceramic powder may include, for example, $BaTiO_3$, $(Ba_{1-x}Ca_x)TiO_3$ $(0<x<1)$, $Ba(T_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$, etc. in which calcium (Ca), zirconium (Zr), or the like is partially dissolved in $BaTiO_3$.

In addition, as a material for forming the dielectric layer 111, various ceramic additives, organic solvents, binders, dispersants, etc. may be added to the powder such as barium titanate ($BaTiO_3$) according to purposes of the present disclosure.

Meanwhile, an average thickness td of the dielectric layer 111 may not be particularly limited. For example, the average thickness td of the dielectric layer 111 may be 0.2 µm or greater and 10 µm or less.

The average thickness td of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The internal electrodes 121 and 122 may be a pair of a first internal electrode 121 and a second internal electrode 122 having different polarities. One end of the plurality of internal electrodes 121 and 122 disposed inside the body 110 may be exposed to (or extend from or be in contact with) the third surface 3 or the fourth surface 4 of the body.

The first and second internal electrodes 121 and 122 may be alternately disposed in the first direction with the dielectric layer 111 interposed therebetween.

One end of the first internal electrode 121 may be exposed to (or extend from or be in contact with) the third surface 3, and one end of the second internal electrode 122 may be exposed to (or extend from or be in contact with) the fourth surface 4. The other end of the first internal electrode 121 may be spaced apart from the fourth surface 4, and the other end of the second internal electrode 122 may be spaced apart from the third surface 3.

The external electrodes 131 and 132 may be disposed on the third surface 3 and the fourth surface 4 of the body to be connected to the internal electrodes 121 and 122.

Referring to FIG. 3, the first internal electrode 121 is formed on the dielectric layer 111. The first internal electrode 121 is not entirely formed in the length direction of the dielectric layer. That is, one end of the first internal electrode 121 may be formed up to the third surface 3 and exposed to (or extending from or in contact with) the third surface 3, and the other end of the first internal electrode 121 may be at a predetermined interval from the fourth surface 4 of the body 110.

An end portion of the first internal electrode 121 exposed to (extending from or in contact with) the third surface 3 of the body 110 may be connected to the first external electrode 131. Contrary to the first internal electrode, one end of the second internal electrode 122 may be exposed to (or extending from or in contact with) the fourth surface 4 to be connected to the second external electrode 132, and the other end of the second internal electrode 122 may be formed at a predetermined interval from the third surface 3.

The internal electrodes 121 and 122 may be laminated as 400 or greater layers in order to realize a high-capacitance multilayer electronic component, but is not limited thereto.

A material for forming the internal electrodes 121 and 122 is not particularly limited, and a material having excellent electrical conductivity may be used. For example, the internal electrodes 121 and 122 may include nickel (Ni), copper (Cu), palladium (Pd), silver (Ag), gold (Au), platinum (Pt), tin (Sn), or tungsten (W)), titanium (Ti), and alloys thereof.

In addition, the internal electrodes 121 and 122 may be formed by printing a conductive paste for internal electrodes including one or greater of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste for internal electrodes, a screen printing method or a gravure printing method may be used but the present disclosure is not limited thereto.

Meanwhile, the average thickness te of the internal electrodes 121 and 122 may not be particularly limited. For example, the average thickness te of the internal electrodes 121 and 122 may be 0.2 µm or greater and 3 µm or less.

The average thickness te of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, the average value may be measured by measuring a thickness of one internal electrode at 30 equal intervals in the length direction in the scanned image. The 30 points at equal intervals may be designated in the capacitance forming portion Ac. In addition, if the average value is measured by extending the measurement of the average value to 10 internal electrodes, the average thickness of the internal electrodes may be further generalized. Other methods and/or tools appreciated by one of ordinary skill in the art, even if not described in the present disclosure, may also be used.

The body 110 may include the capacitance forming portion Ac disposed inside the body 110 and forming capacitance by including the first internal electrode 121 and the second internal electrode 122 disposed to face each other with the dielectric layer 111 interposed therebetween and cover portions 112 and 113 formed on upper and lower surface of the capacitance forming portion Ac in the first direction.

In addition, the capacitance forming portion Ac is a part contributing to capacitance formation of the capacitor, and may be formed by repeatedly laminating the plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer or two or greater dielectric layers on upper and lower surfaces of the capacitance forming portion Ac in the thickness direction, respectively, and may basically serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the average thickness of the cover portions 112 and 113 may not be particularly limited. However, in order to improve capacitance per unit volume of the multilayer electronic component, the average thickness of the cover portions 112 and 113 may be 15 μm or less. According to an exemplary embodiment in the present disclosure, since the side margin portions 114 and 115 include a plurality of first dielectric grains, an occurrence of delamination and cracks in the side margin portions 114 and 115 may be suppressed, and therefore, excellent reliability may be ensured even when the average thickness of the cover portions 112 and 113 is 15 μm or less.

The average thickness of the cover portions 112 and 113 may refer to a size in the first direction and may be a value obtained by averaging sizes of the cover portions 112 and 113 in the first direction measured at five points at equal intervals above or below the capacitance forming portion Ac.

Side margin portions 114 and 115 are disposed on the fifth and sixth surfaces of the body 110.

The side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end surfaces of the body 110 in the width direction.

The side margin portions 114 and 115 may be connected to the internal electrodes 121 and 122 on the fifth and sixth surfaces 5 and 6.

The side margin portions 114 and 115 may basically serve to prevent damage to the internal electrodes due to physical or chemical stress.

The side margin portions 114 and 115 may be formed by attaching separate ceramic green sheets for side margin portions to the fifth and sixth surfaces of the body 110, and may be formed by laminating one or greater ceramic green sheets for side margin portions in the third direction (the width direction) on both end surfaces of the capacitance forming portion Ac in the third direction.

The side margin portions 114 and 115 may include a plurality of first dielectric grains G1, and a ratio (Lx/Sx) of a length Lx of major axis to a minor axis (Sx) of the first dielectric grains G1 may be 3 or greater and 30 or less. However, this does not mean that the side margin portions 114 and 115 are formed of only the first dielectric grains, and the side margin portions 114 and 115 may include other dielectric grains in addition to the first dielectric grain G1.

In order to realize a small and high-capacitance multilayer ceramic capacitor as described above, a method of exposing internal electrodes in a width direction of a body in manufacturing a multilayer ceramic capacitor, thereby maximizing an area of the internal electrodes in the width direction through a design without a margin, and separately attaching a ceramic green sheet for a side margin portion to an electrode exposure surface of the body in the width direction before a process of sintering, and then performing sintering is applied.

By the method of separately attaching the ceramic green sheet for a side margin portion, capacitance per unit volume of the capacitor may be improved but stress may occur in a junction interface of the side margin portion and the body during sintering to cause delamination, cracks, etc, and lower reliability.

A main cause of the stress occurring at the junction interface of the side margin portions 114 and 115 and the body 110 may be a difference in a shrinkage behavior of the side margin portions 114 and 115 and the body 110.

Referring to FIG. 2, in order to minimize an occurrence of stress in the junction interface of the side margin portions 114 and 115 and the body 110, shrinkage of the side margin portions 114 and 115 in the first and second directions should be suppressed. The ceramic green sheet for a side margin portion has a thin plate shape, and based on the assumption that a thickness direction of the plate is a z direction and length and width directions of the plate are xy directions, when the ceramic green sheet for a side margin portion is attached to the fifth and sixth surfaces of the body 110 in the third direction, the third direction of FIG. 2 corresponds to the z direction of the ceramic green sheet for a side margin portion and the first and second directions of FIG. 2 correspond to the xy directions of the ceramic green sheet for a side margin portion. Therefore, a shrinkage rate of the ceramic green sheet for a side margin portion in the xy directions should be suppressed in order to suppress shrinkage of the side margin portions 114 and 115 in the first and second directions and minimize an occurrence of stress at the junction interface of the side margin portions 114 and 115 and the body 110.

According to an exemplary embodiment in the present disclosure, when the side margin portions 114 and 115 include a plurality of first dielectric grains G1, it may be determined that shrinkage of the side margin portions 114 and 115 in the first and second directions has been suppressed during sintering, and since shrinkage of the side margin portions 114 and 115 in the first and second directions is suppressed during sintering, an occurrence of delamination, cracks, etc. of the side margin portions 114 and 115 may be suppressed.

Meanwhile, a method of including the plurality of first dielectric grains G1 in the side margin portion may not be particularly limited. For example, as the side margin portion is formed using a ceramic green sheet for a side margin portion including flake-type powder particle, the plurality of first dielectric grains G1 may be included in the side margin portion. In the process of forming the ceramic green sheet for a side margin portion, when the flake-type powder particle is released through a narrow slot and applied to a carrier film, the flake-type powder particle is aligned in the xy directions of the ceramic green sheet for a side margin portion. Thereafter, when the ceramic green sheet for a side margin portion is sintered, a shrinkage behavior of the ceramic green sheet for a side margin portion in the xy directions may be suppressed and the ceramic green sheet for a side margin portion may be mainly contracted in the z direction due to an effect of suppressing a mechanical shrinkage behavior of the flake-type powder particle aligned in the xy directions and a reduction in contact points between powder particles.

In the cross-sections of the side margin portions 114 and 115 in the first and third directions, the ratio (Lx/Sx) of the length (Lx) of the major axis to the length (Sx) of the minor axis of the first dielectric grain G1 may be 3 or greater and 30 or less.

If Lx/Sx is less than 3, the effect of suppressing shrinkage of the side margin portions 114 and 115 in the first direction during sintering may be insufficient, and a shrinkage rate of the side margin portions 114 and 115 in the first direction during sintering may be greater than a shrinkage rate of the body in the first direction, thereby causing stress in the junction interface of the side margin portions and the body to cause delamination, cracks, etc.

Meanwhile, if Lx/Sx is greater than 30, the effect of suppressing shrinkage in the first direction may be excessive, so that, during sintering, a shrinkage rate of the side margin portions 114 and 115 in the first direction may be less than a shrinkage rate of the body 110 in the first direction and a difference in shrinkage rate between the side margin portions 114 and 115 and the body 110 may rather increase.

Figure 7:
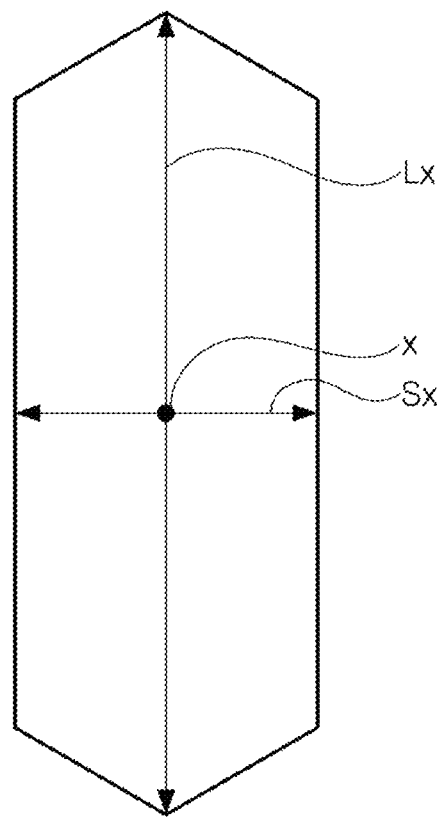
FIG. 7 illustrates a first dielectric grain.

FIG. 7 illustrates a first dielectric grain G1. Referring to FIG. 7, a straight line having a maximum length in the first dielectric grains G1, while passing through the center x of the first dielectric grains G1, may be a major axis of the first dielectric grains G1, and a length of the major axis may be referred to as Lx. In addition, a straight line orthogonal to the major axis at the center x of the first dielectric grains G1 may be a minor axis of the first dielectric grains G1, and a length of the minor axis may be Sx. Here, the center x of the first dielectric grain G1 may refer to the center of gravity of the first dielectric grain G1 observed in the cross-sections in the first and third directions.

The ratio (Lx/Sx) of the length of the major axis to the length of the minor axis of the first dielectric grains G1 may be measured from an image of an exposed cross-section observed using a scanning electron microscope (SEM) or an optical microscope after grinding the multilayer electronic component 100 to the center position of the body 110 in the second direction to expose the first and third directional cross-sections (W-T cross-section).

Figure 8:
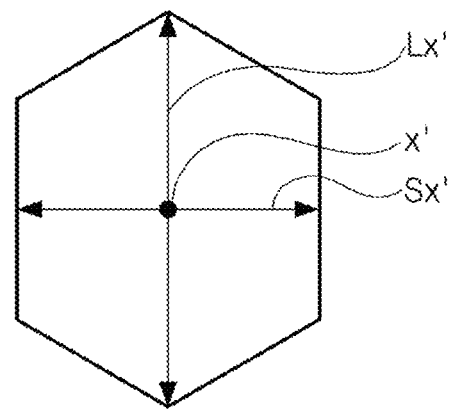
FIG. 8 illustrates a second dielectric grain.

Meanwhile, the method of measuring the minor axis length and the major-axis length of the first dielectric grain G1 described above may be equally applied to the case of measuring the minor axis length and the major axis length of the dielectric grains included in the side margin portion and the dielectric layer. For example, as shown in FIG. 8 illustrating the second dielectric grains G2, a straight line having a maximum length in the second dielectric grain G2, while passing through the center x' of the second dielectric grain G2, may be a major axis of the second dielectric grains G1, and a length of the major axis may be referred to as Lx'. In addition, a straight line orthogonal to the major axis at the center x' of the second dielectric grain G2 may be a minor axis of the second dielectric grain G2, and a length of the minor axis may be referred to as Sx'. Here, the center x' of the second dielectric grain G2 may refer to the center of gravity of the second dielectric grain G1 observed in the first and third directional cross-sections.

In an exemplary embodiment, when the number of dielectric grains included in the side margin portions 114 and 115 is Nm0 and the number of first dielectric grains G1 is Nm1, Nm1/Nm0 may be 0.09 or greater.

If Nm1/Nm0 is less than 0.09, the effect of suppressing shrinkage of the side margin portion in the first direction during sintering may be insufficient. Therefore, Nm1/Nm0 may be preferably 0.09 or greater, and more preferably 0.11 or greater.

Meanwhile, an upper limit of Nm1/Nm0 may not be particularly limited, but preferably Nm1/Nm0 may be 0.65 or less. If Nm1/Nm0 is greater than 0.65 and the number of first dielectric grains G1 is too large, the effect of suppressing shrinkage in the first direction may be excessive so stress in the junction interface of the side margin portion and the body may rather increase or dense sintering may not be achieved due to insufficient sintering driving force due to a reduction of the specific surface area. More preferably, Nm1/Nm0 may be 0.55 or less, and even more preferably 0.45 or less.

In an exemplary embodiment, when the number of first dielectric grains G1 included in the side margin portions 114 and 115 is Nm1 and the number of first dielectric grains G1 in which an angle between the first direction and the major axis is 45 degrees or less is Nm2, Nm2/Nm1 may be 0.55 or greater. More preferably, Nm2/Nm1 may be 0.6 or greater, and even more preferably 0.7 or greater.

Figure 9:
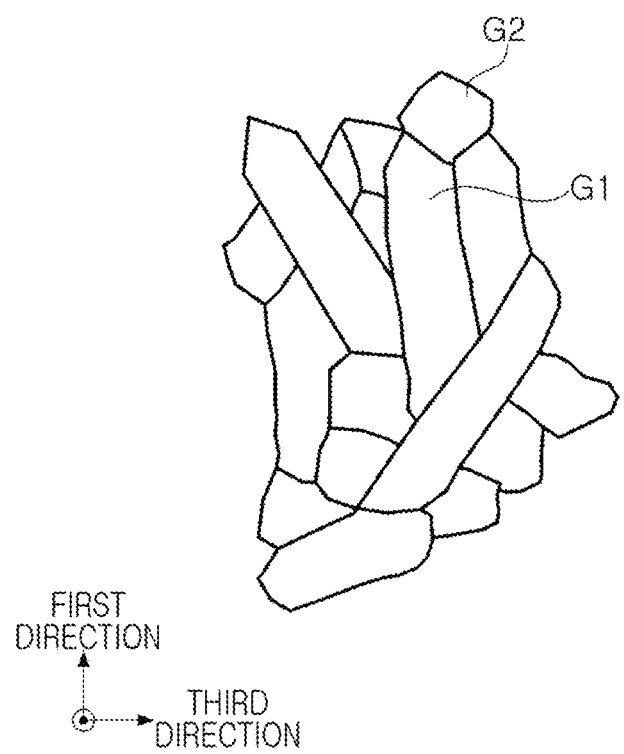
FIG. 9 illustrates that first dielectric grains are aligned in a first direction in a region in which a plurality of first dielectric grains and a plurality of second dielectric grains are mixed.
Figure 12:
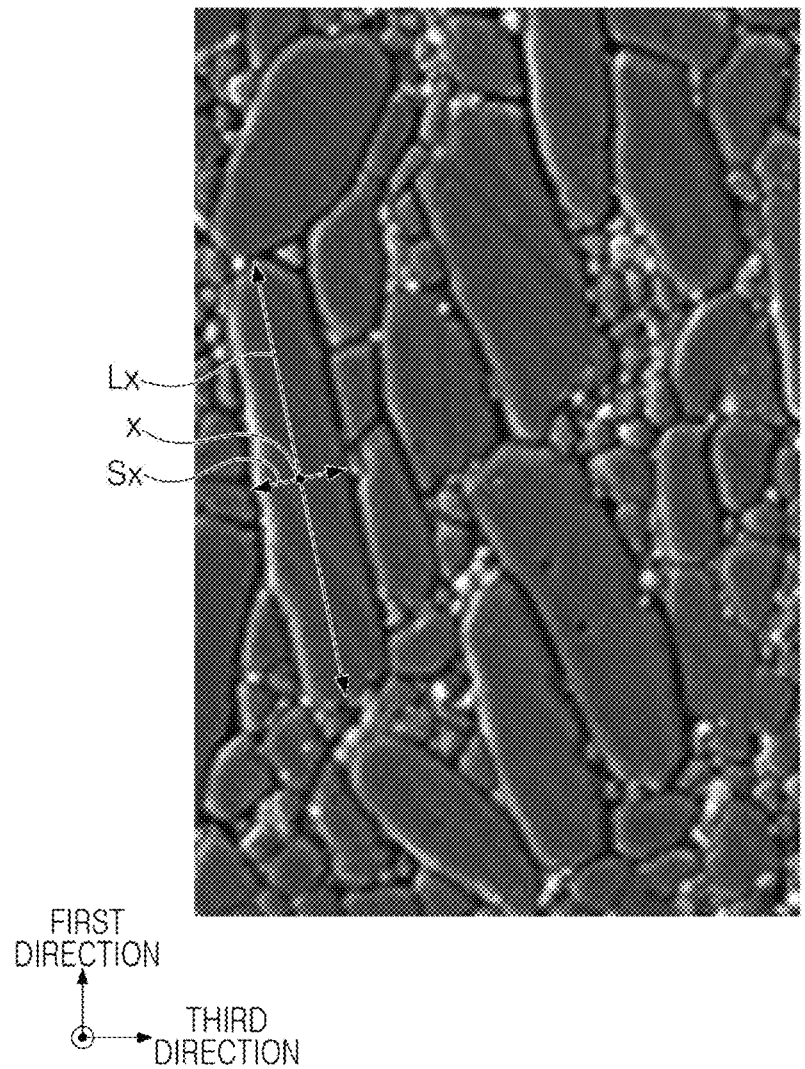
FIG. 12 is an image obtained by scanning a Pm region of FIG. 6 with a scanning electron microscope (SEM)

FIG. 9 illustrates that the first dielectric grains G1 are aligned in the first direction in a region in which the plurality of first dielectric grains G1 and the plurality of second grains G2 are mixed. When the angle between the major axis of the first dielectric grains G1 and the first direction is 45 degrees or less, the first dielectric grains G1 may be considered to be aligned in the first direction, and in this case, the effect of suppressing shrinkage of the side margin portions 114 and 115 in the first direction during sintering may be more remarkable. Accordingly, a Pm region of FIG. 6 may include dielectric grains having the shape shown in FIG. 9. In addition, FIG. 12 is an image of the Pm region of FIG. 6 scanned with a scanning electron microscope (SEM), in which it can be seen that the major axis of the first dielectric grains G1 with the first direction is 45 degrees or less.

Meanwhile, as the value of Nm2/Nm1 is close to 1, the effect of suppressing shrinkage in the first direction by each of the first dielectric grains may be improved, so an upper limit of Nm2/Nm1 may not be particularly limited. However, in order to control Nm2/Nm1 to be greater than 0.9, a separate process may be required or manufacturing time may increase, and thus, Nm2/Nm1 may be 0.9 or less.

The number (Nm0) of dielectric grains included in the side margin portions 114 and 115, the number (Nm1) of first dielectric grains, and the number (Nm2) of first dielectric grains in which an angle between the first direction and the major axis is 45 degrees or less may be measured from an image of a region corresponding to the center of the side margin portion in the first direction in an exposed cross-section observed at 3000 magnifications or greater using a scanning electron microscope (SEM) after grinding the multilayer electronic component 100 to the center position of the body 110 in the second direction to expose the first and third directional cross-sections (W-T cross-section).

Although it is not necessary to specifically limit an observation region, it may be preferable to observe in a region of 50 μm×50 μm or greater and 300 μm×300 μm or less in consideration of dispersion and measurement time. In addition, after obtaining the values of Nm0, Nm1, and Nm2 in a cross-section (W-T cross-section) of the body 110 cut in the first and third directions at five points having equal intervals in the second direction, values obtained by averaging the respective values may be determined to be Nm0, Nm1 and Nm2, thereby further generalizing Nm0, Nm1 and Nm2.

The minor axis length Sx and the major axis length Lx of the first dielectric grain G1 may not be particularly limited. However, the size of the dielectric grain may also affect the shrinkage rate, although it may less affect than the shape of the dielectric grains, the minor axis length Sx of the first dielectric grains may be 100 nm or greater and 500 nm or less, and the major axis length Lx may be preferably 300 nm or greater and 5000 nm or less.

In an exemplary embodiment, when the sum of the minor axis lengths of the dielectric grains included in the side margin portion is Sm and the sum of the major axis lengths is Lm, Lm/Sm may be 1.15 or greater and 2.70 or less. More preferably, Lm/Sm may be 1.2 or greater and 2.0 or less.

If Lm/Sm is less than 1.15, the effect of suppressing shrinkage of the side margin portions 114 and 115 in the first direction during sintering may be insufficient, and a shrinkage rate of the side margin portions in the first direction during sintering may be greater than a shrinkage rate of the body in the first direction, thereby causing stress in the junction interface of the side margin portions and the body to cause problems such as delamination and cracks. Accordingly, Lm/Sm is preferably 1.15 or greater, and more preferably 1.2 or greater.

Meanwhile, if Lm/Sm is more than 2.70, the effect of suppressing shrinkage in the first direction is excessive, and during sintering, the shrinkage rate in the first direction of the side margin portion may be less than a shrinkage rate of the body in the first direction and a difference in shrinkage rate between the side margin portions and the body may rather increase. Accordingly, Lm/Sm may be preferably 2.70 or less, and more preferably 2.0 or less.

Lm and Sm may be measured from an image of a region corresponding to the center of the side margin portion in the first direction in an exposed cross-section observed at 3000 magnifications or greater using a scanning electron microscope (SEM) after grinding the multilayer electronic component 100 to the center position of the body 110 in the second direction to expose the first and third directional cross-sections (W-T cross-section).

Although it is not necessary to specifically limit an observation region, it may be preferable to observe in a region of 50 μm×50 μm or greater and 300 μm×300 μm or less in consideration of dispersion and measurement time. In addition, after obtaining the values of Lm and Sm in a cross-section (W-T cross-section) of the body 110 cut in the first and third directions at five points having equal intervals in the second direction, values obtained by averaging the respective values may be determined to be Lm and Sm, thereby further generalizing Lm and Sm.

Figure 10:
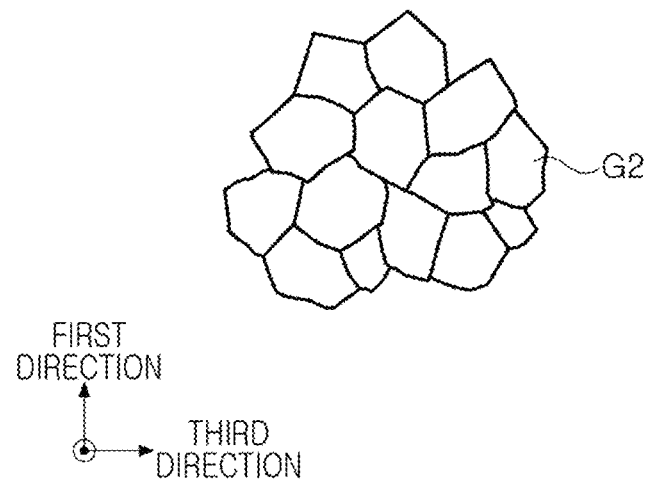
FIG. 10 illustrates a plurality of second dielectric grains.
Figure 11:
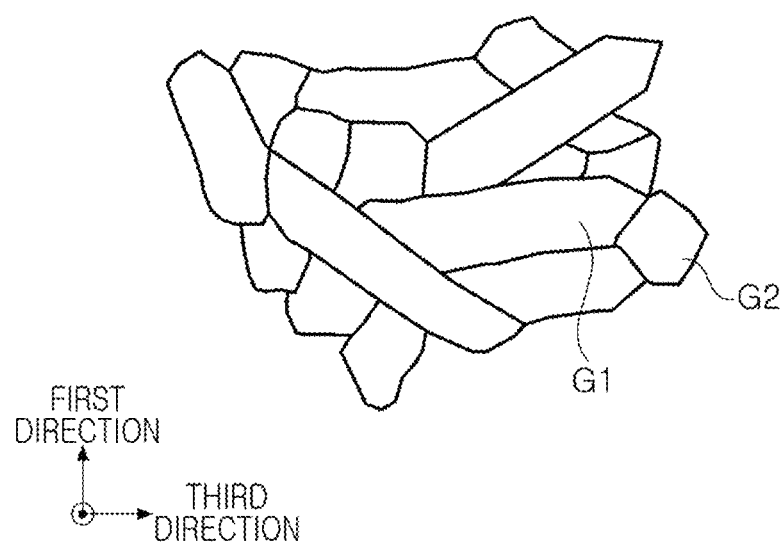
FIG. 11 illustrates that first dielectric grains are aligned in a third direction in a region in which a plurality of first dielectric grains and a plurality of second dielectric grains are mixed.

Referring to FIGS. 9 and 10 or FIGS. 10 and 11, among dielectric grains satisfying a ratio of a major axis length to a minor axis length being 3 or greater and 30 or less in a cross-section of the body in the first and third directions, the number of dielectric grains in one unit area of the side margin portions 114 and 115 may be greater than the number of dielectric grains in one unit area of the dielectric layer 111. In one example, Nm1/Nm0 may be 0.09 or greater. Here, Nm0 may be the number of dielectric grains included in the one unit area of the side margin portions 114 and 115, and Nm1 may be the number of the dielectric grains in the one unit area of the side margin portions 114 and 115 satisfying a ratio of a major axis length to a minor axis length being 3 or greater and 30 or less. Nm2/Nm1 may be 0.55 or greater, in which Nm1 is the number of the dielectric grains in the one unit area of the side margin portions 114 and 115 satisfying a ratio of a major axis length to a minor axis length being 3 or greater and 30 or less, and Nm2 is the number of dielectric grains satisfying a ratio of a major axis length to a minor axis length being 3 or greater and 30 or less in the one unit area of the side margin portion 114 and 115 and having an angle between the first direction and the major axis being 45 degrees or less. In one example, Lm/Sm may be 1.15 or greater and 2.70 or less, preferably 1.2 or greater and 2.0 or less, in which Sm is a sum of minor axis lengths of dielectric grains in the one unit area of the side margin portion 114 and 115 and Lm is a sum of major axis lengths of the dielectric grains included in the one unit area of the side margin portions 114 and 115.

The method of forming the side margin portions 114 and 115 is not particularly limited, but as will be described later, the side margin portions 114 and 115 may be formed using a ceramic green sheet for a side margin portion including spherical powder particle and flake-type powder particle. Details regarding a method of forming the side margin portions 114 and 115 will be described later.

Meanwhile, the size of the side margin portions 114 and 115 in the third direction may not be particularly limited.

However, in order to improve the capacitance per unit volume of the multilayer electronic component 100, the average size of the side margin portions 114 and 115 in the third direction may be 15 μm or less. According to an exemplary embodiment in the present disclosure, since the side margin portions 114 and 115 include a plurality of first dielectric grains, the occurrence of delamination and cracks in the side margin portions 114 and 115 may be suppressed, and thus, excellent reliability may be secured even when the average size of the side margin portions 114 and 115 in the third direction is 15 μm or less.

A lower limit of an average size of the side margin portions 114 and 115 in the third direction is not particularly limited. However, if the average size of the side margin portions 114 and 115 in the third direction is less than 2 μm, it may be difficult to prevent short circuits of the internal electrodes 121 and 122 exposed to the fifth and sixth surfaces, and therefore, the lower limit of the average size of the side margin portions 114 and 115 in the third direction may be 2 μm.

The average size of the side margin portions 114 and 115 in the third direction may be a value obtained by averaging the sizes of the side margin portions 114 and 115 in the third direction measured at five equally spaced points in a region in contact with the capacitance forming portion Ac.

According to an exemplary embodiment in the present disclosure, since the side margin portions 114 and 115 are formed by attaching a ceramic green sheet for a side margin portion to a side surface of the body 110 unlike the related art, the sizes of the side margin portions 114 and 115 in the third direction for each position may be uniform.

That is, in the related art, since the side margin portions are formed by applying or printing a ceramic slurry, thickness deviations of the side margin portions in each position are severe.

Specifically, in the related art, a size tc1 in the third direction at the center of the side margin portions 114 and 115 in the first direction is thicker than a size of other regions of the side margin portion in the third direction.

For example, in the related art, a ratio (tc2/tc1) of a third-directional size tc2 in a region in contact with the internal electrodes 121 and 122 disposed at the outermost portion in the first direction to the third-directional size tc1 in the first-directional center of the side margin portions 114 and 115 is about less than 0.9 and a deviation is large.

As described above, in the case of the related art in which the thicknesses of the side margin portions at each position have large deviations, since the proportion of the side margin portions in the multilayer electronic component having the same size is large so that it may be difficult to secure a large size of the capacitance forming portion and there is a difficulty in securing high capacitance.

Meanwhile, according to an exemplary embodiment in the present disclosure, since the ratio (tc2/tc1) of the third-directional size tc2 in the region in contact with the internal electrodes 121 and 122 disposed at the first-directional outermost portion to the third-directional size tc1 in the first-directional center of the side margin portions 114 and 115 may be 0.9 or grater and 1.0 or less, the third-directional size of the side margin portions 114 and 115 may be reduced so that the size of the capacitance forming portion Ac may be increased.

In an exemplary embodiment in the present disclosure, unlike the related art, since the side margin portions 114 and 115 are formed by attaching a ceramic green sheet to the side surface of the body, the sizes of the side margin portions 114 and 115 at each position may be uniform in the third direction, and a high capacitance multilayer electronic component may be easily implemented.

In addition, the ratio (tc3/tc2) of the third-directional size tc3 in the first-directional outermost region to the third-directional size tc2 in a region in contact with the internal electrode disposed at the first-directional outermost portion of the side margin portions 114 and 115 may be 0.9 or grater and 1.0 or less. Due to the above characteristics, the third-directional size deviation of each region of the side margin portions 114 and 115 is small, so that the size of the capacitance forming portion Ac may be secured to be large, thereby implementing a high capacitance multilayer electronic component.

Hereinafter, specific examples of the grains included in the dielectric layer 111 will be described. However, unlike the side margin portions 114 and 115, the dielectric grains included in the dielectric layer 111 may not be particularly limited and may be designed in consideration of a desired capacitance, insulation resistance, and the like.

The dielectric layer 111 may include a plurality of second dielectric grains G2.

The Pd region of the dielectric layer 111 in FIG. 6 may include a plurality of second dielectric grains G2 as shown in FIG. 10, and in the second dielectric grain G2, a ratio of a major axis length Lx' to a minor axis length Sx' may be 1.5 or less. When the dielectric layer is formed using general spherical powder particle, most of the dielectric grains may have the shape such as the second dielectric grains G2. In addition, a lower limit of Lx'/Sx' is 1.0, and a case in which the minor axis length and the major axis length are the same corresponds to the second dielectric grain G2.

Meanwhile, the minor axis length Sx' and the major axis length Lx' of the second dielectric grain G2 may not be particularly limited. For example, the minor axis length Sx' of the second dielectric grain G2 may be 100 nm or greater and 500 nm or less, and the major axis length Lx' may be 100 nm or greater and 500 nm or less.

In an exemplary embodiment, when the sum of the minor axis lengths of the dielectric grains included in the dielectric layer 111 is Sd and the sum of the major axis lengths is Ld, Ld/Sd may be less than 1.15. This is because, when the dielectric layer is formed using general spherical powder particle, most dielectric grains may have such a shape as the second dielectric grain G2.

However, it is not necessary to limit the dielectric layer 111 of the present disclosure to include only the second dielectric grains. In an exemplary embodiment, the dielectric layer 111 may also include a plurality of first dielectric grains G1. In addition, as the dielectric layer 111 includes a plurality of first dielectric grains, Ld/Sd may be 1.5 or greater.

As shown in FIG. 11, the Pd region of the dielectric layer 111 in FIG. 6 may be a region in which a plurality of first dielectric grains G1 and a plurality of second dielectric grains G2 are mixed, and a ratio (Lx/Sx) of the major axis length Lx to the minor axis length Sx of the first dielectric grain G1 may be 3 or greater and 30 or less. As the dielectric layer 111 includes a plurality of first dielectric grains G1, the number of dielectric grains disposed per thickness of the dielectric layer 111 may be maintained at a similar level, while reducing the total number of dielectric grains included in the dielectric layer 111, and thus, a decrease in permittivity may be suppressed even at a high electric field.

In this case, the number of first dielectric grains included in the dielectric layer 111 may not be particularly limited. For example, when the number of dielectric grains included in the dielectric layer 111 is Nd0 and the number of first dielectric grains G1 is Nd1, Nd1/Nd0 may be 0.15 or greater.

The first dielectric grains included in the side margin portions 114 and 115 are mainly aligned in the first direction, but the first dielectric grains G1 included in the dielectric layer 111 may be aligned in the third direction. Specifically, when the number of first dielectric grains G1 included in the dielectric layer 111 is Nd1, and the number of first dielectric grains G1 in which an angle between the third direction and the major axis is 45 degrees or less is Nd2, Nd2/Nd1 may be greater than or equal to 0.55.

FIG. 11 illustrates that the first dielectric grains G1 are aligned in the third direction. When the angle between the major axis of the first dielectric grains G1 and the third direction is 45 degrees or less, it may be considered that the first dielectric grains G1 are aligned in the third direction, and in this case, the effect of suppressing the decrease of permittivity in a high electric field may be more remarkable.

Meanwhile, as the value of Nd2/Nd1 is close to 1, the effect of suppressing the decrease in permittivity in the high electric field may be improved by each of the first dielectric grains, so it is not necessary to specifically limit an upper limit of Nd2/Nd1.

The number (Nd0) of dielectric grains included in the dielectric layer 111, the number (Nd1) of first dielectric grains, and the number (Nd2) of first dielectric grains in which an angle between the third direction and the major axis is 45 degrees or less may be measured from an image of a region corresponding to the center of the capacitance forming portion Ac in an exposed cross-section observed at 3000 magnifications or greater using a scanning electron microscope (SEM) after grinding the multilayer electronic component 100 to the center position of the body 110 in the second direction to expose the first and third directional cross-sections (W-T cross-section).

Although it is not necessary to specifically limit an observation region, it may be preferable to observe in a region of 50 μm×50 μm or greater and 300 μm×300 μm or less in consideration of dispersion and measurement time. In addition, after obtaining the values of Nd0, Nd1, and Nd2 in a cross-section (W-T cross-section) of the body 110 cut in the first and third directions at five points having equal intervals in the second direction, values obtained by averaging the respective values may be determined to be Nd0, Nd1, and Nd2, thereby further generalizing Nd0, Nd1, and Nd2.

The external electrodes 131 and 132 may be disposed on the third surface 3 and the fourth surface 4 of the body 110.

The external electrodes 131 and 132 may include a first external electrode 131 disposed on the third surface 3 of the body 110 and connected to the first internal electrode 121 and a second external electrode 132 disposed on the fourth surface 4 of the body 110 and connected to the second internal electrode 122. At this time, the first internal electrode 121 may be connected to the first external electrode 131 on the third surface 3 and connected to the side margin portions 114 and 115 on the fifth and sixth surfaces 5 and 6, and the second internal electrode 122 may be connected to the second external electrode 132 on the fourth surface 4 and connected to the side margin portions 114 and 115 on the fifth and sixth surfaces 5 and 6.

In the present exemplary embodiment, a structure in which the multilayer electronic component 100 has two external electrodes 131 and 132 is described, but the number and shape of the external electrodes 131 and 132 may be changed according to the shape of the internal electrodes 121 and 122 or for other purposes.

In addition, the external electrodes 131 and 132 may be disposed to cover a portion of the side margin portions 114 and 115. For example, the external electrodes 131 and 132 may be disposed to partially cover both end surfaces of the side margin portions 114 and 115 in the second direction. In addition, as shown in FIG. 1, the external electrodes 131 and 132 may be disposed to extend to cover both end surfaces of the side margin portions 114 and 115 in the second direction and cover portions of the side margin portions 114 and 115 in the first and third directions.

Meanwhile, the external electrodes 131 and 132 may be formed using any material as long as the material has electrical conductivity, such as metal, and specific materials may be determined in consideration of electrical characteristics and structural stability, and furthermore, the external electrodes 131 and 132 may have a multilayer structure.

As an example of the multilayer structure of the external electrodes 131 and 132 with reference to FIG. 4, the external electrodes 131 and 132 may include electrode layers 131a and 132a disposed on the body 110, conductive resin layers 131b and 132b disposed on the electrode layers 131a and 132a, and plating layers 131c and 132c disposed on the conductive resin layers 131b and 132b.

However, the present disclosure is not limited thereto, and the external electrodes may have a two-layer structure including the electrode layers 131a and 132a and a plating layer disposed on the electrode layers 131a and 132a.

The electrode layers 131a and 132a may be sintered electrodes including conductive metal and glass. Also, the electrode layers 131a and 132a may be formed by transferring a sheet including a conductive metal onto the body. In addition, the first and second electrode layers 131a and 132a may also be formed using an atomic layer deposition (ALD) method, a molecular layer deposition (MLD) method, a chemical vapor deposition (CVD) method, a sputtering method or the like.

The conductive metal used in the electrode layers 131a and 132a may not be particularly limited as long as the conductive metal is a material that may be electrically connected to the internal electrode to form capacitance, and may include one or more selected from the group consisting of, for example, nickel (Ni), copper (Cu), palladium (Pd), silver (Ag), gold (Au), platinum (Pt), tin (Sn), tungsten (W), titanium (Ti), and alloys thereof.

The conductive resin layers 131b and 132b may be resin-based electrodes including a conductive metal and a resin.

The conductive metal used in the conductive resin layers 131b and 132b is not particularly limited as long as the conductive metal is a material that may be electrically connected to the internal electrode to form capacitance, and may include one or more selected from the group consisting of, for example, nickel (Ni), copper (Cu), palladium (Pd), silver (Ag), gold (Au), platinum (Pt), tin (Sn), tungsten (W), titanium (Ti), and alloys thereof.

The plating layers 131c and 132c may serve to improve mounting characteristics.

The type of the plating layers 131c and 132c is not particularly limited, and may be a plating layer including one or more of Cu, Ni, Sn, Ag, Au, Pd, and alloys thereof, and may be formed of a plurality of layers.

As a more specific example of the plating layers 131c and 132c, the plating layers 131c and 132c may have a single-layer shape as a Ni plating layer or a Sn plating layer, may have a form in which a Ni plating layer and a Sn plating layer are sequentially formed, or may have a form in which a Sn plating layer, the Ni plating layer, and the Sn plating layer are sequentially formed. In addition, the plating layers 131c and 132c may include a plurality of Ni plating layers and/or a plurality of Sn plating layers.

A size of the multilayer electronic component 100 may not be particularly limited.

However, as the size of the multilayer electronic component 100 increases, an area which the side margin portions and the body are in contact with each other may increase, and as the contact area increases, stress occurring at the junction interface of the side margin portion and the body during sintering may gradually increase. Accordingly, when the side margin portion does not include the plurality of first dielectric grains, the occurrence of delamination and cracks may be remarkable as the size of the multilayer electronic component 100 increases.

Meanwhile, according to the present disclosure, since the side margin portions 114 and 115 include a plurality of first dielectric grains to control the shrinkage behavior of the side margin portions, the occurrence of delamination and cracks may be suppressed. Therefore, even if the size of the multilayer electronic component 100 increases, the occurrence of delamination, cracks, and the like may be effectively suppressed.

In particular, when the size of the multilayer electronic component 100 is 3225 (length x width, 3.2 mm×2.5 mm) or greater, the effect of suppressing the occurrence of delamination and cracks according to the present disclosure may be more remarkable. Therefore, when manufacturing errors and external electrode sizes are taken into consideration, the reliability improvement effect according to the present disclosure may be more remarkable when a maximum size of the multilayer electronic component 100 in the second direction is 3.0 mm or greater and a maximum size in the third direction is 2.3 mm or greater.

Figure 15:
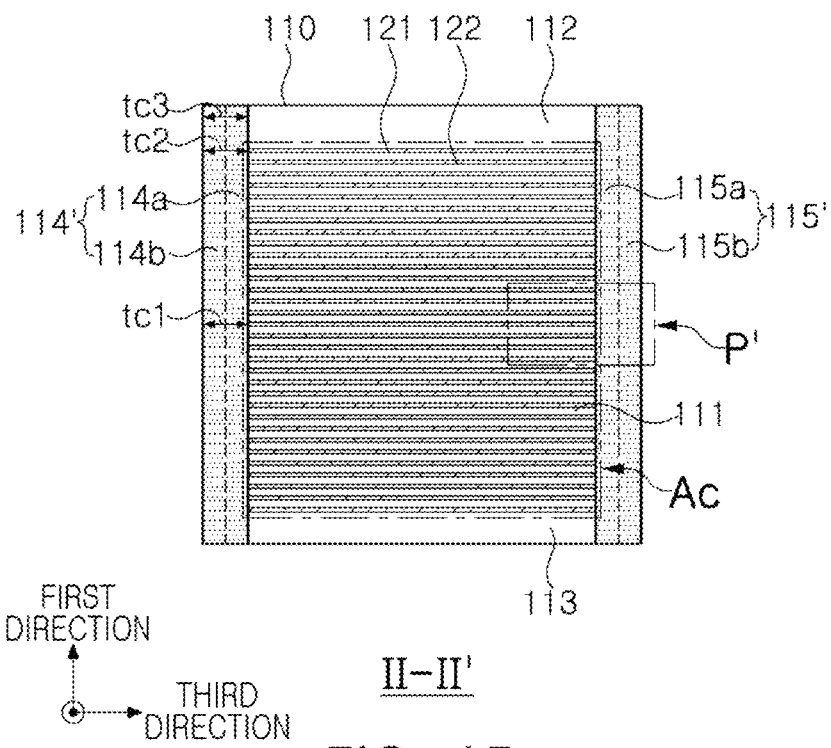
FIG. 15 is a cross-sectional view taken along line II-II' of a multilayer electronic component according to a modification of FIG. 1.
Figure 16:
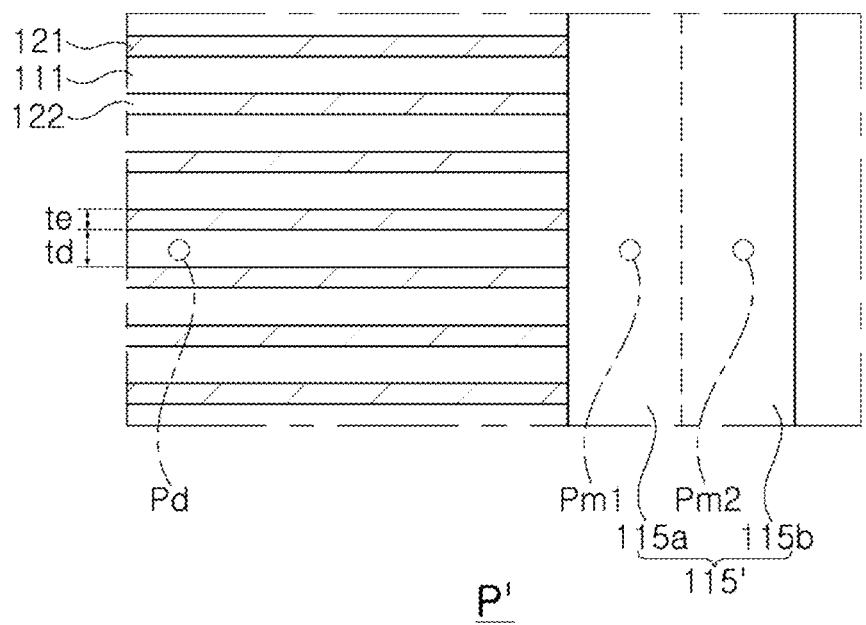
FIG. 16 is an enlarged view of a region P' of FIG. 15.

FIG. 15 is a cross-sectional view taken along line II-II' of a multilayer electronic component according to a modified example of FIG. 1. FIG. 16 is an enlarged view of a region P' of FIG. 15.

Referring to FIGS. 15 and 16, the side margin portions 114' and 115' may include first regions 114a' and 115a' adjacent to the body 110 and second regions 114b' and 115b' adjacent to an outer surface of the multilayer electronic component, and the number of first dielectric grains G1 included in the first regions 114a' and 115a' may be less than the number of first dielectric grains G1 included in the second regions 114b' and 115b'.

By disposing a plurality of first dielectric grains G1 in the first regions 114a' and 115a', which are regions adjacent to the body 110, an occurrence of stress between the body 110 and the side margin portions 114' and 115' may be minimized, and the first dielectric grains G1 may be disposed to be minimized in the second regions 114b' and 115b' less affected by the stress occurring at the interface between the body 110 and the side margin portions 114' and 115'.

In this case, the second regions 114b' and 115b' may not include the first dielectric grains G1, the first regions 114a' and 115a' may be formed using a ceramic green sheet for a side margin portion, and the second regions 114b' and 115b' may be formed using a ceramic green sheet for forming the dielectric layer 111. Accordingly, a Pm1 region of FIG. 16 may include the dielectric grains having a shape shown in FIG. 9, and the Pm2 region of FIG. 16 may include the dielectric grains having a shape shown in FIG. 10.

In addition, as the side margin portions 114' and 115' become away from a plane in which the side margin portions 114' and 115' are in contact with the body, a ratio of the sum of the major axis lengths to the sum of the minor axis lengths of the dielectric grains included in the side margin portions may increase, and accordingly, stress occurring at the interface between the body and the side margin portions may be minimized with the smaller number of first dielectric grains.

However, it is not necessary to limit the side margin portions to the shape described above, and the number of first dielectric grains included in the first regions 114a' and 115a' may be greater than the number of first dielectric grains included in the second regions 114b' and 115b' in consideration of a shrinkage rate of the body in the first direction. In addition, the ratio of the sum of the major axis lengths to the sum of the minor axis lengths of the dielectric grains of the side margin portions 114' and 115' may decrease in a direction away from the plane in contact with the body.

Method of Manufacturing Multilayer Electronic Component

Figure 17:
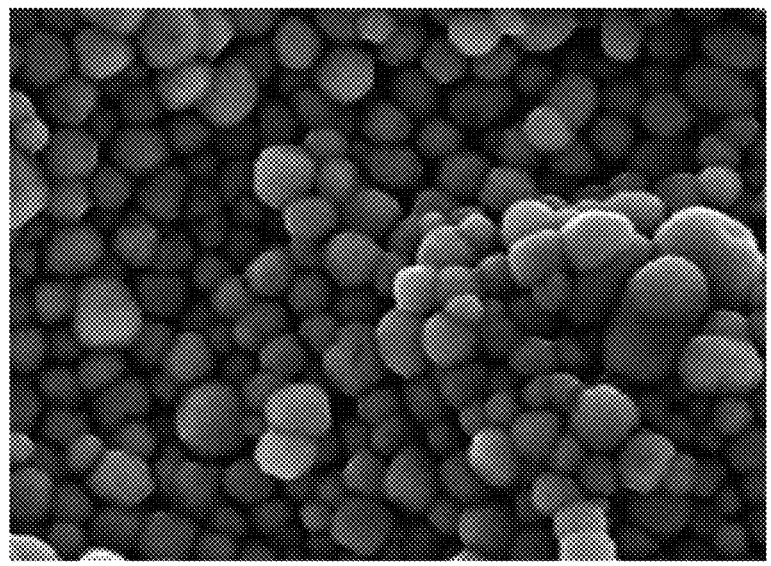
FIG. 17 is a photograph of spherical powder particle.
Figure 18:
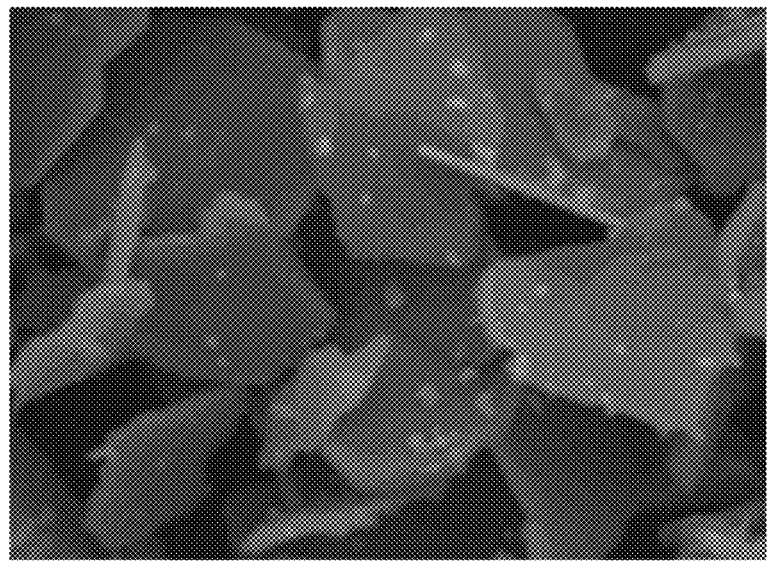
FIG. 18 is a photograph of flake-type powder particle.
Figure 19:
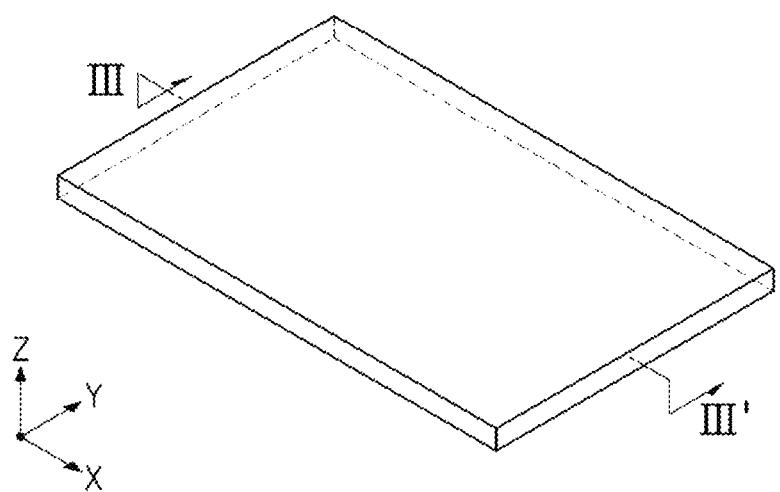
FIG. 19 is a perspective view of a ceramic green sheet for a side margin portion.

FIG. 17 is a photograph of a spherical powder particle. FIG. 18 is a photograph of the flake-type powder particle. FIG. 19 is a photograph of a cross-section of a ceramic green sheet including spherical powder particle and flake-type powder particle. FIGS. 21A to 21F are cross-sectional and perspective views schematically illustrating a method of manufacturing a multilayer electronic component according to an exemplary embodiment in the present disclosure.

Hereinafter, a method of manufacturing a multilayer electronic component according to an exemplary embodiment in the present disclosure will be described in detail with reference to FIGS. 17 to 19 and 21A to 21F.

A method of manufacturing a multilayer electronic component according to an exemplary embodiment in the present disclosure may include preparing a first ceramic green sheet in which a plurality of first internal electrode patterns are formed at a predetermined interval and a second ceramic green sheet in which a plurality of second internal electrode patterns are formed at a predetermined interval; forming a ceramic green sheet laminated body by laminating the first ceramic green sheet and the second ceramic green sheet such that the first internal electrode patterns and the second internal electrode patterns intersect each other; obtaining a laminated body by cutting the ceramic green sheet laminated body to have a side surface in which ends of the first internal electrode patterns and the second internal electrode patterns are exposed in a width direction; attaching a ceramic green sheet for a side margin portion to the side surface in which the ends of the first internal electrode patterns and the second internal electrode patterns of the laminated body are exposed; sintering the laminated body to which the ceramic green sheet for a side margin portion is attached; performing heat-treatment under a reducing atmosphere after the sintering; and forming external electrodes on the laminated body heat-treated under the reducing atmosphere.

A ceramic green sheet 214 for a side margin portion may include spherical powder particle and flake-type powder particle.

Referring to FIG. 17, the spherical powder particle is not perfectly spherical, but may have an almost spherical shape. An average particle diameter of the spherical powder particle may be 50 nm or greater and 400 nm or less.

Referring to FIG. 18, the flake-type powder particle may refer to a powder having a substantially flat surface and a thin thickness, although not perfectly flat. A thickness of the plate-like powder may be 0.1 μm or greater and 0.5 μm or less, and a diameter of the surface may be 0.5 μm or greater and 5 μm or less. By controlling the thickness and surface diameter of the flake-type powder particle within the above ranges, the occurrence of delamination and cracks in the side margin portions may be suppressed by controlling a shrinkage rate of the side margin portions in the first direction, and the first dielectric grain G1 in which a minor axis length is 100 nm or greater and 500 nm or less and a major axis length is 300 nm or greater and 5000 nm or less may be easily formed.

The ceramic green sheet 214 for a side margin portion may be manufactured by adding spherical powder particle or flake-type powder particle as raw material powder to a binder or an organic solvent such as ethanol and wet-mixing the powder and the solvent to prepare a slurry, applying the slurry on a carrier film through a narrow slit, and drying the slurry.

Figure 20:
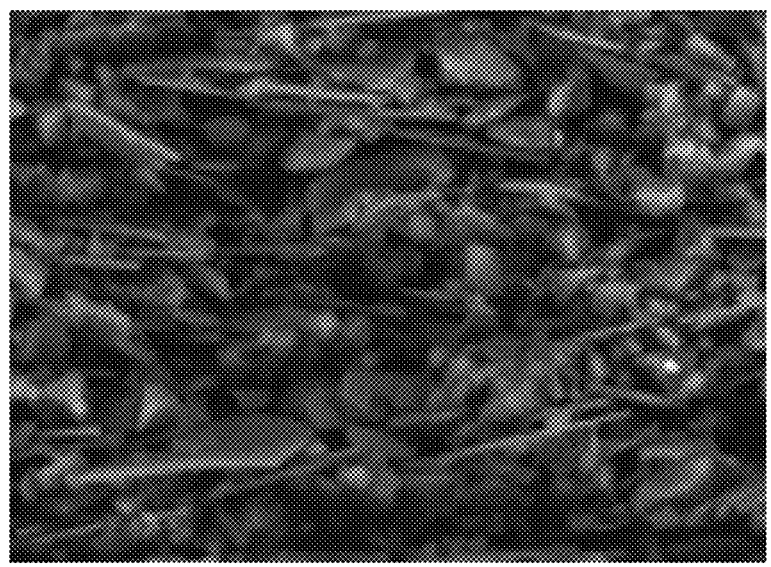
FIG. 20 is a photograph of a cross-section of a ceramic green sheet including spherical powder particle and flake-type powder particle.

Referring to FIG. 19, the ceramic green sheet for a side margin portion may have a thin plate shape, and a thickness direction of the plate may be the z direction, and length and width directions of the plate may be the xy directions. When the flake-type powder particle is released through a narrow slot and applied to a carrier film, the flake-type powder particle is aligned in the xy directions of the ceramic green sheet for a side margin portion. FIG. 20 is an image of a cross-section (z-directional and y-directional cross-section) of the ceramic green sheet for a side margin portion of FIG. 19, taken along line III-III' and observed with an SEM. It can be seen that the flake-type powder particle is aligned in the xy direction. When sintering the ceramic green sheet for a side margin portion, an xy-directional shrinkage behavior may be suppressed during sintering of the ceramic green sheet for a side margin portion by the effect of suppressing a mechanical shrinkage behavior of the flake-type powder particle aligned in the xy direction and a reduction in a contact point between the powder particles, and the ceramic green sheet may be mainly contracted in the z direction. Since the z direction of the ceramic green sheet for a side margin portion corresponds to a third direction of the side margin portions 114 and 115 and the x-direction or the y-direction corresponds to the first direction of the side margin portions 114 and 115, a first directional shrinkage rate of the side margin portions may be suppressed, thereby suppressing an occurrence of delamination, cracks, and the like, of the side margin portions.

Figure 13:
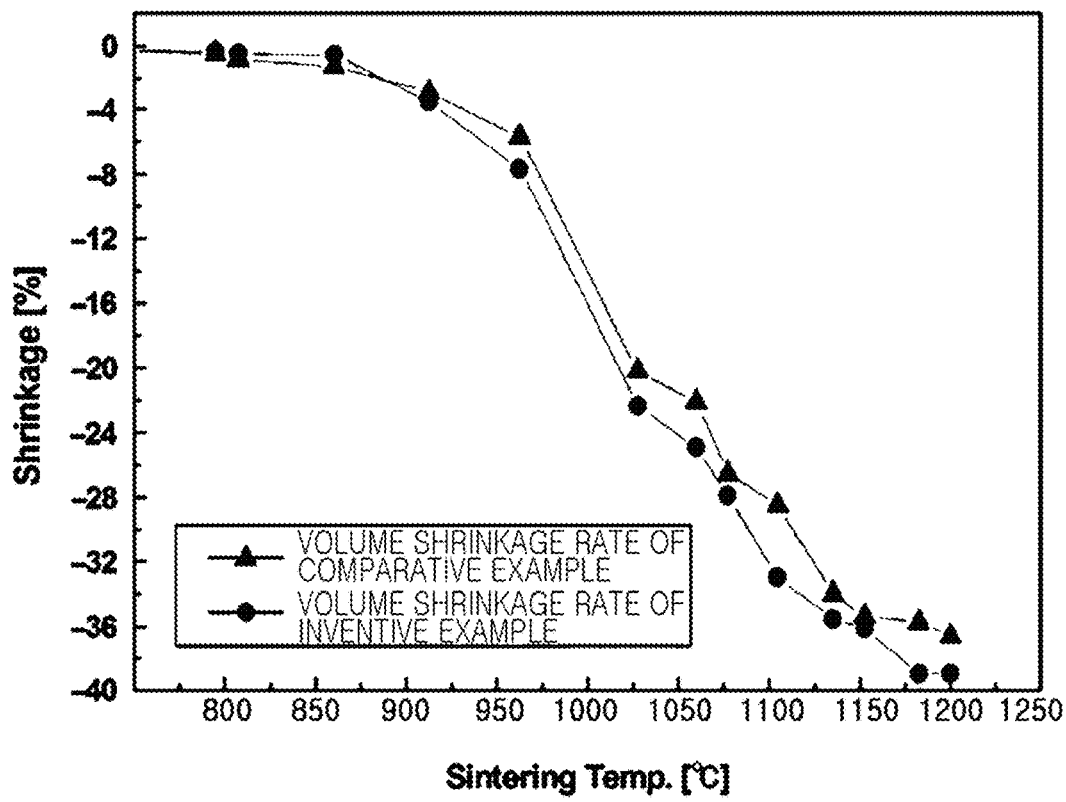
FIG. 13 is a graph illustrating volume shrinkage of Comparative Examples and Inventive Examples.
Figure 14:
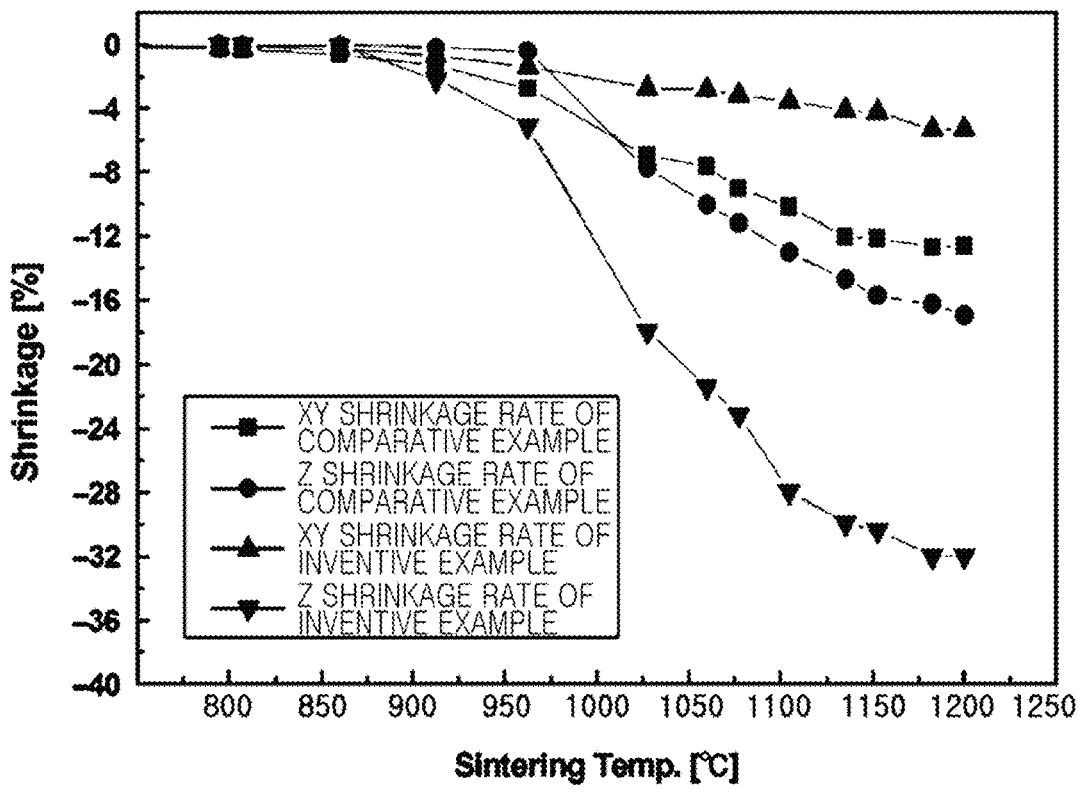
FIG. 14 is a graph illustrating xy shrinkage and z shrinkage of Comparative Examples and Inventive Examples.

FIG. 13 is a graph illustrating a volume shrinkage rate according to sintering temperature of Comparative Examples and Inventive Examples, and FIG. 14 is a graph illustrating xy shrinkage rate and z shrinkage rate according to sintering temperature of Comparative Examples and Inventive Examples. Here, Comparative Example is a ceramic green sheet including a spherical powder particle and not including a flake-type powder particle, and Invention Example is a ceramic green sheet in which a weight ratio of the flake-type powder particle to a total weight of the spherical powder particle and the flake-type powder particle is 0.3. In the case of volume shrinkage rate, Comparative Example and Inventive Example have similar values, but when xy shrinkage rate and z shrinkage rate are separately measured as shown in FIG. 14, the xy shrinkage rate is significantly lower in the Inventive Example than in the Comparative Example, and the z shrinkage rate in the Inventive Example is significantly high, compared to the Comparative Example. Therefore, it can be seen that, when the ceramic green sheet includes the flake-type powder particle, the shrinkage rate in the xy direction is suppressed during sintering and the shrinkage rate in the z direction is increased.

In an exemplary embodiment, a ratio (Mb/Ma) of the weight (Mb) of the flake-type powder particle to the total weight (Ma) of the spherical powder particle and the flake-type powder particle included in the ceramic green sheet for a side margin portion may be 0.19 or greater and 0.80 or less. That is, a value obtained by dividing the weight (Mb) of the flake-type powder particle included in the ceramic green sheet for a side margin portion by the total weight (Ma) of the spherical powder particle and the flake-type powder particle may be 0.19 or greater and 0.80 or less.

Accordingly, it is possible to suppress the first directional shrinkage rate of the side margin portions 114 and 115 to suppress the occurrence of delamination and cracks in the side margin portions 114 and 115, and the side margin portions 114 and 115 may include dielectric grains having the shape shown in FIG. 9.

In order to further suppress the occurrence of delamination and cracks in the side margin portions 114 and 115, the ratio (Mb/Ma) of the weight of the flake-type powder particle to the total weight of the spherical powder particle and the flake-type powder particle included in the ceramic green sheet for a side margin portion may be 0.25 or greater and 0.70 or less.

The spherical powder particle and the plate-like powder are materials having high permittivity and are not particularly limited as long as the materials obtain sufficient electrostatic capacity. For example, a barium titanate-based material, a lead composite perovskite-based material, or a strontium titanate-based material may be used. The barium titanate-based material may include $BaTiO_3$-based ceramic powder, and the ceramic powder may include, for example, $BaTiO_3$ or $(Ba_{1-x}Ca_x)TiO_3$ (0<x<1), $Ba(Ti_{1-y}Ca_y)O_3$ (0<y<1), $(Ba_{1-x}Ca_x)(T_{1-y}Zr_y)O_3$ (0<x<1, 0<y<1), or $Ba(Ti_{1-y}Zr_y)O_3$ (0<y<1) in which calcium (Ca), zirconium (Zr), or the like is partially dissolved in $BaTiO_3$.

The ceramic green sheet 211 for forming the dielectric layer may include spherical powder particle. The same spherical powder particle as the spherical powder particle included in the ceramic green sheet 214 for a side margin portion may be used, but is not limited thereto. When the ceramic green sheet 211 mainly includes spherical powder particle, the dielectric layer 111 may include dielectric grains having the shape shown in FIG. 10.

However, it is also possible to use the ceramic green sheet 214 for a side margin portion described above as the ceramic green sheet 211 for forming the dielectric layer. In this case, the dielectric layer 111 may include dielectric grains having a shape shown in FIG. 11.

Figure 21A:
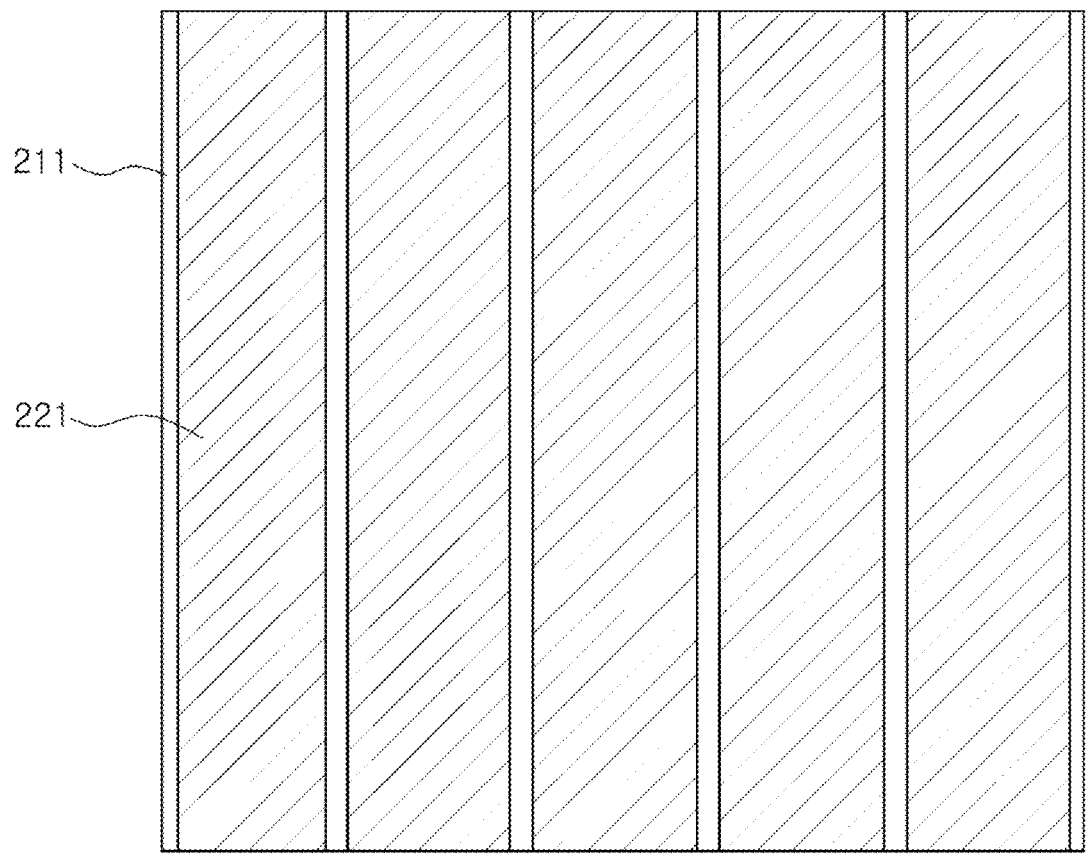
FIGS. 21A to 21F are cross-sectional and perspective views schematically illustrating a method of manufacturing a multilayer electronic component according to an exemplary embodiment in the present disclosure.

As shown in FIG. 21A, a plurality of stripe-shaped first internal electrode patterns 221 are formed on the ceramic green sheet 211 at predetermined intervals. The plurality of stripe-shaped first internal electrode patterns 221 may be formed parallel to each other.

The stripe-shaped first internal electrode pattern 221 may be formed of an internal electrode paste including a conductive metal. The conductive metal may be one or more of nickel (Ni), copper (Cu), palladium (Pd), silver (Ag), gold (Au), platinum (Pt), tin (Sn), tungsten (W), titanium (Ti), and alloys thereof but is not limited thereto.

A method of forming the stripe-shaped first internal electrode pattern 221 on the ceramic green sheet 211 is not particularly limited, but may be formed by, for example, a printing method such as a screen printing method or a gravure printing method.

Also, although not shown, a plurality of stripe-shaped second internal electrode patterns 222 may be formed on another ceramic green sheet 211 at predetermined intervals therebetween.

Hereinafter, the ceramic green sheet on which the first internal electrode pattern 221 is formed may be referred to as a first ceramic green sheet, and the ceramic green sheet on which the second internal electrode pattern 222 is formed may be referred to as a second ceramic green sheet.

Figure 21B:
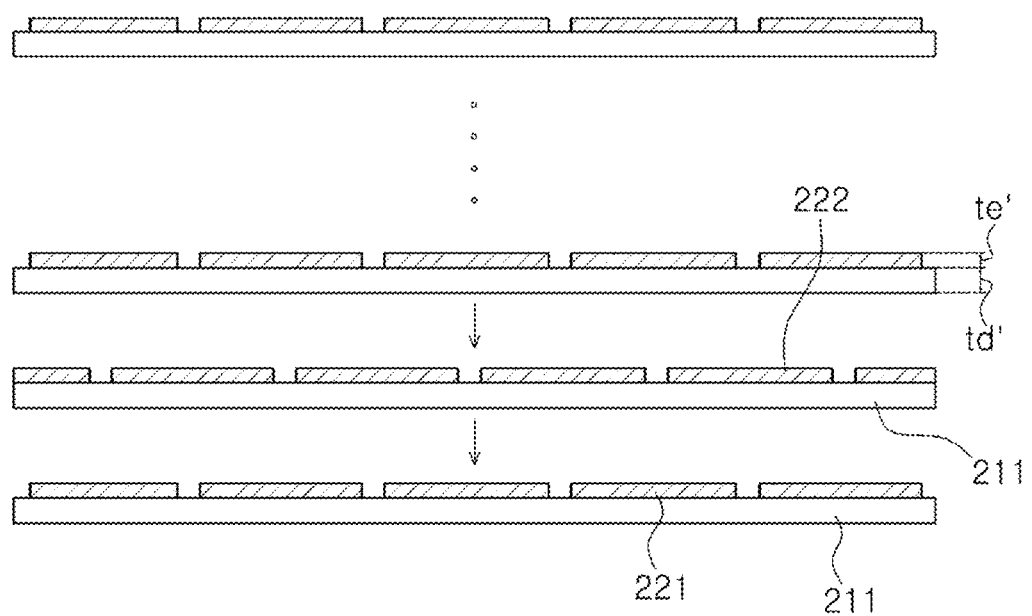

Next, as shown in FIG. 21B, the first and second ceramic green sheets may be alternately laminated so that the stripe-shaped first internal electrode pattern 221 and the stripe-shaped second internal electrode pattern 222 are laminated in a stagger manner.

Thereafter, the stripe-shaped first internal electrode pattern 221 may become the first internal electrode 121, and the stripe-shaped second internal electrode pattern 222 may become the second internal electrode 122.

In this case, in order to control the thickness of the dielectric layer and the internal electrodes of the multilayer electronic component, a thickness td' of the first and second ceramic green sheets and a thickness te' of the first and second internal electrode patterns may be controlled.

Figure 21C:
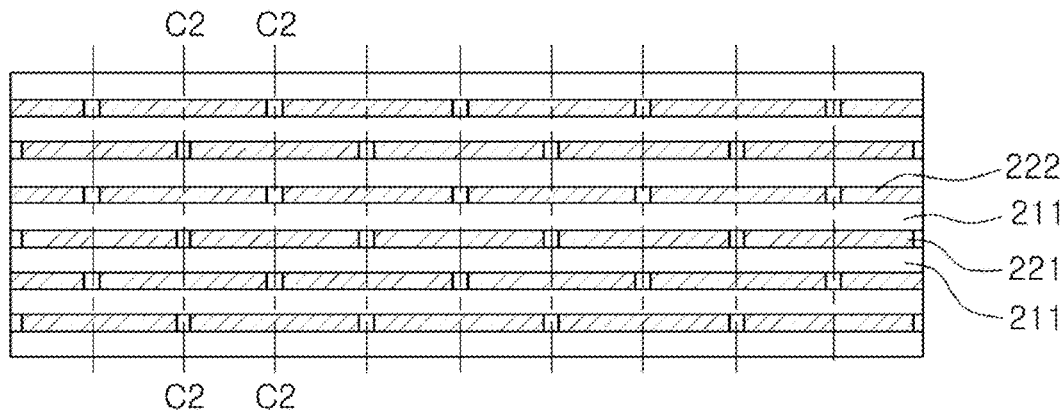
Figure 21D:
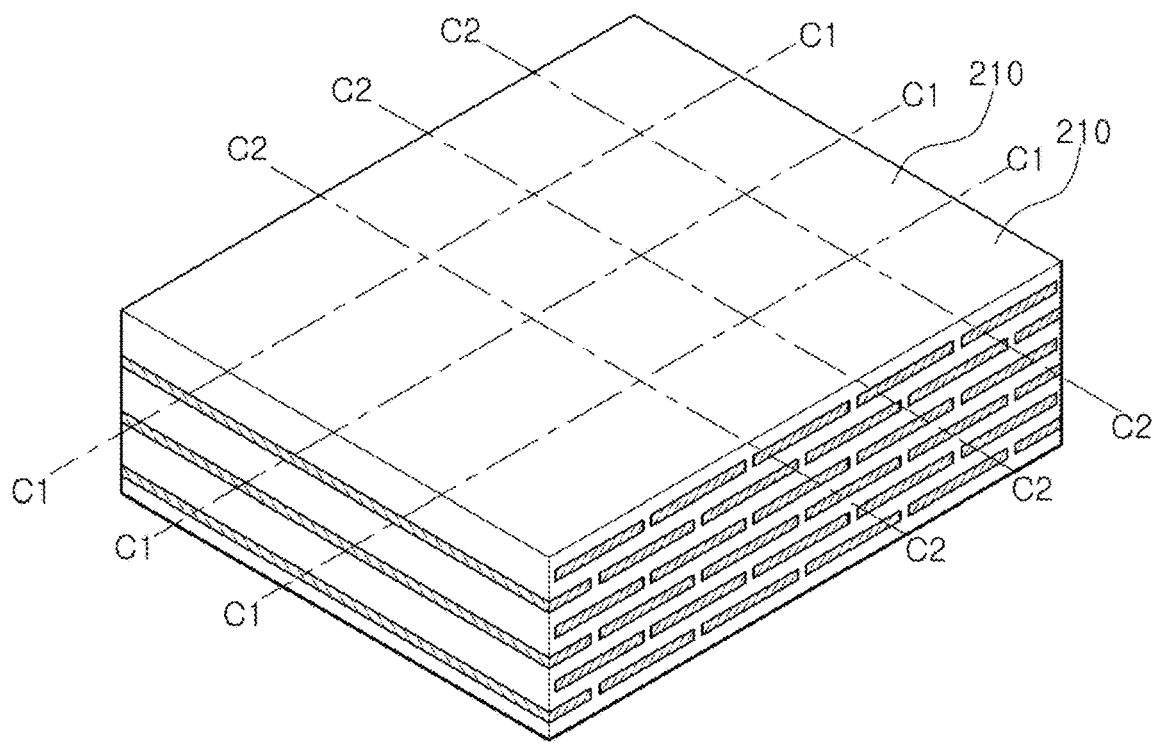

FIG. 21C is a cross-sectional view illustrating a ceramic green sheet laminated body 220 in which first and second ceramic green sheets are laminated according to an exemplary embodiment in the present disclosure, and FIG. 21D is a perspective view illustrating the ceramic green sheet laminated body 220 in which first and second ceramic green sheets are laminated.

Referring to FIGS. 21C and 21D, the first ceramic green sheet on which a plurality of parallel stripe-shaped first internal electrode patterns 221 are printed and the second ceramic green sheet on which a plurality of parallel stripe-shaped second internal electrode patterns 222 are printed are alternately laminated on each other.

More specifically, the first ceramic green sheet and the second ceramic green sheet may be laminated such that a central portion of the stripe-shaped first internal electrode pattern 221 printed on the first ceramic green sheet and an interval between the stripe-shaped second internal electrode patterns 222 printed on the second ceramic green sheet overlap each other.

Next, as shown in FIG. 21D, the ceramic green sheet laminated body 220 may be cut to cross the plurality of stripe-shaped first internal electrode patterns 221 and the stripe-shaped second internal electrode patterns 222. That is, the ceramic green sheet laminated body 210 may be the laminated body 210 cut along cut lines C1-C1 and C2-C2 that are orthogonal to each other.

More specifically, the stripe-shaped first internal electrode pattern 221 and the stripe-shaped second internal electrode pattern 222 may be cut in the length direction to be divided into a plurality of internal electrodes having a uniform width. At this time, the laminated ceramic green sheet is also cut together with the internal electrode pattern. Accordingly, the dielectric layer may be formed to have the same width as a width of the internal electrode.

Also, cutting may be performed to fit individual body sizes along the cut line C2-C2. That is, before forming the first side margin portion and the second side margin portion, a rod-shaped laminate may be cut into individual body sizes along the cut line C2-C2 to form a plurality of laminated bodies 210.

That is, the rod-shaped laminate may be cut so that the central portion of the overlapped first internal electrode and the predetermined interval formed between the second internal electrodes are cut by the same cut line. Accordingly, one end of the first internal electrode and the second internal electrode may be alternately exposed to a cut surface.

Thereafter, a first side margin portion and a second side margin portion may be formed on the first and second side surfaces of the laminated body 210 to which both the first and second internal electrode patterns are exposed. The first and second side surfaces of the laminated body 210 correspond to the fifth and sixth surfaces of the body 110.

Figure 21E:
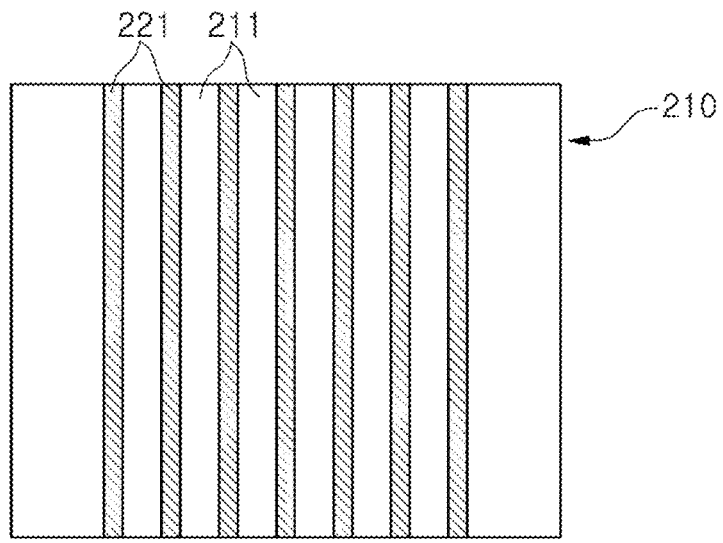
Figure 21E:
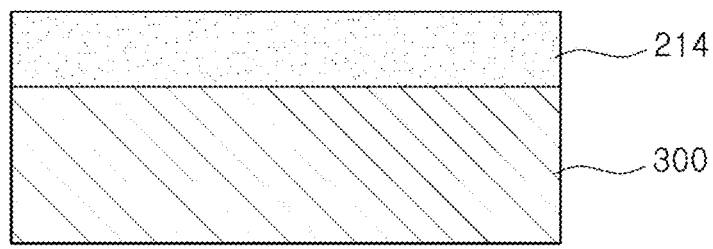

Next, as shown in FIG. 21E, the ceramic green sheet 214 for a side margin portion may be attached to the side surface of the laminated body 210 to which ends of the first and second internal electrode patterns are exposed.

A first side margin portion may be formed by attaching the ceramic green sheet 214 for a side margin portion to the first side surface of the laminated body 210, and thereafter, a second side margin portion may be formed by attaching the ceramic green sheet 214 for a side margin portion to the second side surface of the laminated body 220.

Specifically, in the method of forming the first side margin portion, the ceramic green sheet 214 for a side margin portion is disposed on a punching elastic material 300 formed of a rubber material.

Next, after rotating the laminated body 210 by 90 degrees so that the first side surface of the laminated body 210 faces the ceramic green sheet 214 for a side margin portion, the laminated body 210 may be pressed to be adhered to the ceramic green sheet 214 for a side margin portion.

When the laminated body 210 is pressed and adhered to the ceramic green sheet 214 for a side margin portion to transfer the ceramic green sheet 214 for a side margin portion to the laminated body 210, the ceramic green sheet 214 for a side margin portion may be formed up to a side edge portion of the laminated body 210 due to the punching elastic material 300 of a rubber material, and a remaining portion may be cut.

Figure 21F:
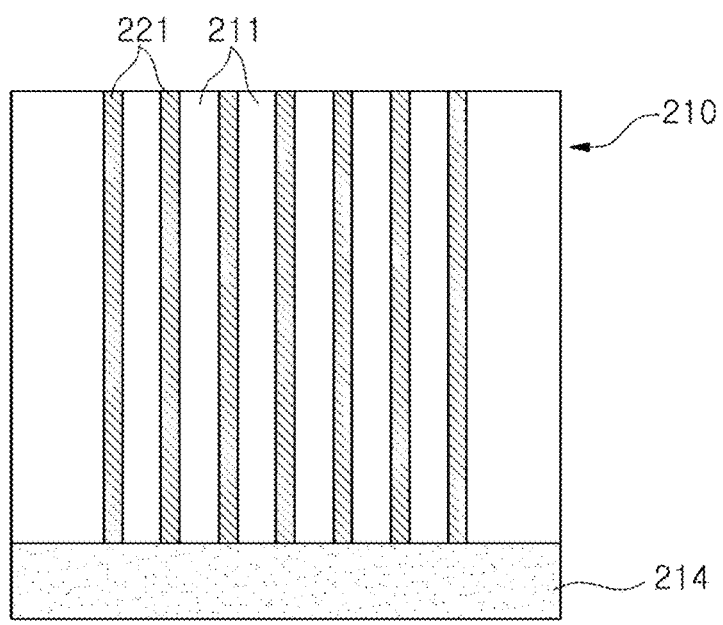

In FIG. 21F, it is illustrated that the ceramic green sheet 214 for a side margin portion is formed up to the side edge portion of the laminated body 210.

Thereafter, the laminated body 210 may be rotated by 180 degrees and the process described above may be repeated to form a second side margin portion on the second side surface of the laminated body 210.

Next, the laminated body 210 to which the ceramic green sheet for a side margin portion is attached may be sintered. After the sintering is finished, cooling may be performed, and thereafter, a heat treatment may be performed in a reducing atmosphere.

Thereafter, external electrodes may be formed on a third side surface of the body to which the first internal electrode is exposed and a fourth side surface of the body to which the second internal electrode is exposed, respectively. The third and fourth side surfaces of the laminated body 210 correspond to the third and fourth surfaces of the body 110.

A method of forming the external electrodes is not particularly limited, and a method of dipping into a paste including a conductive metal and glass may be used, or the external electrodes may be formed by transferring a sheet including a conductive metal. In addition, the external electrodes may be formed using a paste including a conductive metal and a resin or using an atomic layer deposition (ALD) method, a molecular layer deposition (MLD) method, a chemical vapor deposition (CVD) method, a sputtering method, or the like. Thereafter, a plating layer may be formed by performing a plating process.

Example

In order to check the effect of suppressing an occurrence of cracks by the first dielectric grains included in the side margin portion, sample chips were manufactured by adjusting the ratio of the flake-type powder particle included in the ceramic green sheet for a side margin portion. Meanwhile, the dielectric layer was formed using a ceramic green sheet containing spherical powder particle but not flake-type powder particle, and a size of the sample chips was 3225 (length×width×thickness: 3.2 mm×2.5 mm×2.5 mm).

In Table 1 below, Mb/Ma refers to a ratio of a weight (Mb) of the flake-type powder particle to a total weight (Ma) of the spherical powder particle and the flake-type powder particle included in the ceramic green sheet for a side margin portion.

In addition, Lm/Sm, Nm1/Nm0, Nm2/Nm1, and crack incidence rate of the sample chips were measured and described in Table 1 below.

Lm/Sm is a value obtained by dividing the sum (Lm) of the major axis lengths of the dielectric grains included in the side margin portion by the sum (Sm) of the minor axis lengths, Nm1/Nm0 is a value obtained by dividing the number (Nm1) of the first dielectric grains included in the side margin portion by the number (Nm0) of the dielectric grains, and Nm2/Nm1 is a value obtained by dividing the number (Nm2) of first dielectric grains in which an angle between the first direction and the major axis is 45 degrees or less by Nm1. Here, the first dielectric grains refer to dielectric grains in which a ratio (Lx/Sx) of a major axis length (Lx) to a minor axis length (Sx) is 3 or greater and 30 or less.

LmLm/Sm, Nm1/Nm0, and Nm2/Nm1 were obtained by measuring dielectric grains included in a region of 50 μm×50 μm positioned at the center of the side margin portion in the first direction in an exposed cross-section using a scanning electron microscope (SEM) after grinding each sample chip to the center position in the second direction to expose the first and third directional cross-sections (W-T cross-sections).

The crack incidence rate was evaluated for sample chips by preparing 400 samples for each test number. While grinding each sample chip in the second direction (the length direction) to the position of the center of the sample chip in the second direction, the first and third directional cross-sections (W-T cross-sections) were exposed at one-fifth, two-fifths and three-fifths (center) of a chip length L, respectively, and then, an interface of the side margin portion and the ceramic body was observed. A case in which a length of cracks in the exposed cross-section was 5 μm or greater was determined to have cracks, and a ratio of the sample chips with cracks, among 400 sample chips, was described.

TABLE 1

| Test No. | Mb/Ma | Lm/Sm | Nm1/Nm0 | Nm2/Nm1 | Crack incidence rate |
|---|---|---|---|---|---|
| 1 | 0.067 | 1.05 | 0.029 | 0.333 | 35.0% |
| 2 | 0.144 | 1.11 | 0.065 | 0.429 | 22.5% |
| 3 | 0.194 | 1.15 | 0.091 | 0.600 | 7.5% |
| 4 | 0.224 | 1.18 | 0.107 | 0.667 | 2.5% |
| 5 | 0.251 | 1.21 | 0.123 | 0.786 | 0.0% |
| 6 | 0.324 | 1.30 | 0.167 | 0.850 | 0.0% |
| 7 | 0.419 | 1.43 | 0.231 | 0.867 | 0.0% |
| 8 | 0.545 | 1.67 | 0.333 | 0.840 | 0.0% |
| 9 | 0.627 | 1.88 | 0.412 | 0.871 | 0.0% |
| 10 | 0.793 | 2.56 | 0.615 | 0.875 | 5.0% |
| 11 | 0.828 | 2.78 | 0.667 | 0.820 | 15.0% |
| 12 | 0.857 | 3.00 | 0.714 | 0.833 | 22.5% |

It can be seen that, in the case of Test Nos. 1 and 2, Lm/Sm was less than 1.15 and the crack incidence rate was high as 22.5%, whereas Test No. 3 having Lm/Sm of 1.15 had a crack incidence rate of 7.5%, which was significantly lower than that of Test No. 2. In Test Nos. 1 and 2, the number of first dielectric grains was too small, and the ratio of the first dielectric grains aligned in the first direction was too small.

In the case of Test Nos. 11 and 12, Lm/Sm was greater than 2.70 and the crack incidence rate was high as 15.0%, whereas, in Test No. 10 in which Lm/Sm was 2.56, the crack incidence rate was 5.0%, which was significantly lower than that of Test No. 11.

It can be seen that, Test Nos. 3 to 10 satisfied Lm/Sm of 1.15 or greater and 2.7 or less, which is a range suggested in an exemplary embodiment in the present disclosure, and thus the crack incidence rate was significantly reduced.

In particular, Test Nos. 5 to 9 had a value of Lm/Sm of 1.21 to 1.88 and was evaluated that none of the 400 samples had cracks, so that the crack suppression effect was very excellent.

One of the various effects of the present disclosure is that the side margin portion includes a plurality of first dielectric grains to control the shrinkage behavior of the side margin portion to suppress the occurrence of delamination and cracks in the side margin portion.

In addition, one of the various effects of the present disclosure is to improve the reliability of the multilayer electronic component.

In addition, one of the various effects of the present disclosure is to improve the capacitance per unit volume.

While exemplary embodiments have been shown and described above, it will be apparent to those skilled in the art that modifications and deviations could be made without departing from the scope of the present disclosure as defined by the appended claims.

What is claimed is:

1. A multilayer electronic component comprising:
   a body including a dielectric layer and first and second internal electrodes disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
   first and second side margin portions respectively disposed on the fifth and sixth surfaces; and
   external electrodes respectively disposed on the third and fourth surfaces,
   wherein the first side margin portion includes first dielectric grains,
   the dielectric layer includes second dielectric grains, and
   in cross-sections of the first side margin portion and the body in the first and third directions,
   a ratio of a major axis length to a minor axis length of the first dielectric grain is 3 or greater and 30 or less, and
   a ratio of a major axis length to a minor axis length of the second dielectric grain is 1.5 or less.

2. The multilayer electronic component of claim 1, wherein Nm1/Nm0 is 0.09 or greater in which Nm0 is the number of dielectric grains included in the first side margin portion and Nm1 is the number of first dielectric grains.

3. The multilayer electronic component 1, wherein Nm2/Nm1 is 0.55 or greater in which Nm1 is the number of first dielectric grains included in the first side margin portion and Nm2 is the number of first dielectric grains in which an angle between the first direction and the major axis is 45 degrees or less.

4. The multilayer electronic component of claim 1, wherein the minor axis length of the first dielectric grain is 100 nm or greater and 500 nm or less, and the major axis length of the first dielectric grain is 300 nm or greater and 5000 nm or less.

5. The multilayer electronic component of claim 1, wherein the minor axis length of the second dielectric grain is 100 nm or greater and 500 nm or less, and the major axis length of the second dielectric grain is 100 nm or greater and 500 nm or less.

6. The multilayer electronic component of claim 1, wherein Lm/Sm is 1.15 or greater and 2.70 or less in which Sm is a sum of minor axis lengths of dielectric grains included in the first side margin portion and Lm is a sum of major axis lengths of the dielectric grains included in the first side margin portion, in the cross-sections of the first side margin portion in the first and third directions.

7. The multilayer electronic component of claim 1, wherein Lm/Sm is 1.2 or greater and 2.0 or less in which Sm is a sum of the minor axis lengths of dielectric grains included in the first side margin portion and Lm is a sum of the major axis lengths of dielectric grains included in the first side margin portion, in the cross-sections of the first side margin portion in the first and third directions.

8. The multilayer electronic component of claim 6, wherein Ld/Sd is 1.15 or less in which Sd is a sum of minor axis lengths of dielectric grains included in the dielectric layer and Ld is a sum of major axis lengths of the dielectric grains included in the dielectric layer, in the cross-sections of the body in the first and third directions.

9. The multilayer electronic component of claim 1, wherein the first side margin portion includes a first region adjacent to the body and a second region adjacent to an outer surface of the multilayer electronic component, and
   the number of first dielectric grains included in the first region is less than the number of first dielectric grains included in the second region.

10. The multilayer electronic component of claim 1, wherein a ratio of a sum of major axis lengths of dielectric grains of the first side margin portion to a sum of minor axis lengths of the dielectric grains of the first side margin portion increases in a direction away from a surface of the first side margin portion in contact with the body.

11. The multilayer electronic component of claim 1, wherein the first side margin portion includes a first region adjacent to the body and a second region adjacent to an outer surface of the multilayer electronic component, and
   the number of first dielectric grains included in the first region is greater than the number of first dielectric grains included in the second region.

12. The multilayer electronic component of claim 1, wherein a ratio of a sum of major axis lengths of dielectric grains of the first side margin portion to a sum of minor axis lengths of the dielectric grains of the first side margin portion decreases in a direction away from a surface of the first side margin portion in contact with the body.

13. The multilayer electronic component of claim 1, wherein an average size of the first side margin portion in the third direction is 15 μm or less.

14. The multilayer electronic component of claim 1, wherein, in the first side margin portion, a third directional size in a region in contact with the internal electrode disposed at a first directional outermost portion, compared to a third directional size in the first directional center is 0.9 or greater and 1.0 or less.

15. The multilayer electronic component of claim 1, wherein, in the first side margin portion, a third directional size in a first directional outermost region, compared to a third directional size in a region in contact with the internal electrode disposed at the first directional outermost portion is 0.9 or greater and 1.0 or less.

16. The multilayer electronic component of claim 1, wherein, a maximum size of the multilayer electronic component in the second direction is 3.0 mm or greater and a maximum size of the multilayer electronic component in the third direction is 2.3 mm or greater.

17. The multilayer electronic component of claim 1, wherein
the external electrodes include a first external electrode disposed on the third surface and a second external electrode disposed on the fourth surface,
the first internal electrode is connected to the first external electrode on the third surface and connected to the first and second side margin portions on the fifth and sixth surfaces, and
the second internal electrode is connected to the second external electrode on the fourth surface and connected to the first and second side margin portions on the fifth and sixth surfaces.

18. The multilayer electronic component of claim 1, wherein
the first side margin portion is formed using a ceramic green sheet including spherical powder particle and flake-type powder particle,
an average particle diameter of the spherical powder particle is 50 nm or greater and 400 nm or less, and
a thickness of the flake-type powder particle is 0.1 μm or greater and 0.5 μm or less, and a diameter of a surface of the flake-type powder particle is 0.5 μm or greater and 5 μm or less.

19. The multilayer electronic component of claim 18, wherein a weight ratio of a weight of the flake-type powder particle to a total weight of the spherical powder particle and the flake-type powder particle included in the ceramic sheet is 0.19 or greater and 0.80 or less.

20. A multilayer electronic component comprising:
a body including a dielectric layer and first and second internal electrodes disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
first and second side margin portions respectively disposed on the fifth and sixth surfaces; and
external electrodes respectively disposed on the third and fourth surfaces,
wherein the first side margin portion includes first dielectric grains, and
in cross-sections of the body in the first and third directions,
a ratio of a major axis length to a minor axis length of the first dielectric grain is 3 or greater and 30 or less, and Nm2/Nm1 is 0.55 or greater in which Nm1 is the number of first dielectric grains included in the first side margin portion and Nm2 is the number of first dielectric grains in which an angle between the first direction and the major axis is 45 degrees or less.

21. The multilayer electronic component of claim 20, wherein Nm1/Nm0 is 0.09 or greater in which Nm0 is the number of dielectric grains included in the first side margin portion.

22. The multilayer electronic component of claim 20, wherein the minor axis length of the first dielectric grain is 100 nm or greater and 500 nm or less, and the major axis length of the first dielectric grain is 300 nm or greater and 5000 nm or less.

23. The multilayer electronic component of claim 20, wherein Lm/Sm is 1.15 or greater and 2.70 or less in which Sm is a sum of minor axis lengths of dielectric grains included in the first side margin portion and Lm is a sum of major axis lengths of the dielectric grains included in the first side margin portion, in the cross-sections of the first side margin portion in the first and third directions.

24. The multilayer electronic component of claim 20, wherein Lm/Sm is 1.2 or greater and 2.0 or less in which Sm is a sum of minor axis lengths of dielectric grains included in the first side margin portion and Lm is a sum of major axis lengths of the dielectric grains in the first side margin portion, in the cross-sections of the first side margin portion in the first and third directions.

25. The multilayer electronic component of claim 20, wherein
the dielectric layer includes second dielectric grains, and
a ratio of a major axis length to a minor axis length of the second dielectric grain in the cross-sections of the body in the first and third directions is 1.5 or less.

26. The multilayer electronic component of claim 25, wherein Ld/Sd is 1.15 or less in which Sd is a sum of minor axis lengths of dielectric grains included in the dielectric layer and Ld is a sum of major axis lengths of the dielectric grains included in the dielectric layer, in the cross-sections of the body in the first and third directions.

27. The multilayer electronic component of claim 25, wherein the minor axis length of the second dielectric grain is 100 nm or greater and 500 nm or less, and the major axis length of the second dielectric grain is 100 nm or greater and 500 nm or less.

28. The multilayer electronic component of claim 20, wherein the dielectric layer includes a plurality of first dielectric grains.

29. The multilayer electronic component of claim 28, wherein Ld/Sd is 1.15 or greater in which Sd is a sum of minor axis lengths of dielectric grains included in the dielectric layer and Ld is a sum of major axis lengths of the dielectric grains included in the dielectric layer, in the cross-sections of the body in the first and third directions.

30. The multilayer electronic component of claim 20, wherein a maximum size of the multilayer electronic component in the second direction is 3.0 mm or greater and a maximum size of the multilayer electronic component in the third direction is 2.3 mm or greater.

* * * * *